(12) United States Patent
Günther et al.

(10) Patent No.: US 10,194,584 B2
(45) Date of Patent: Feb. 5, 2019

(54) CUTTING KNIFE FOR A CUTTING HEAD OF A TRIMMER

(71) Applicant: Andreas Stihl AG & Co. KG, Waiblingen (DE)

(72) Inventors: David Günther, Kernen (DE); Fabian Pöhler, Fellbach (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 11 days.

(21) Appl. No.: 15/408,461

(22) Filed: Jan. 18, 2017

(65) Prior Publication Data

US 2017/0208740 A1 Jul. 27, 2017

(30) Foreign Application Priority Data

Jan. 23, 2016 (DE) .................... 10 2016 000 719
Mar. 3, 2016 (DE) .................... 10 2016 002 607

(51) Int. Cl.
*A01D 34/73* (2006.01)
*A01D 34/82* (2006.01)

(52) U.S. Cl.
CPC ......... *A01D 34/733* (2013.01); *A01D 34/826* (2013.01)

(58) Field of Classification Search
CPC .................... A01D 34/733; A01D 34/826
USPC ................................... 30/276, 347
See application file for complete search history.

(56) References Cited

U.S. PATENT DOCUMENTS

| | | | | |
|---|---|---|---|---|
| 4,107,841 A | * | 8/1978 | Rebhun ............. | A01D 34/736 30/276 |
| 4,856,194 A | * | 8/1989 | Lee .................... | A01D 34/736 30/276 |
| 5,220,774 A | * | 6/1993 | Harbeke ............ | A01D 34/4168 30/276 |
| 5,430,943 A | * | 7/1995 | Lee .................... | A01D 34/4168 30/276 |
| 5,887,349 A | * | 3/1999 | Walden ............. | A01D 34/736 30/276 |
| 6,052,907 A | * | 4/2000 | Wang ................. | A01D 34/416 30/276 |

(Continued)

FOREIGN PATENT DOCUMENTS

| | | |
|---|---|---|
| CA | 2199430 | 9/1997 |
| DE | 2811437 | 9/1979 |
| WO | 90/14755 | 12/1990 |

*Primary Examiner* — Hwei C Payer
(74) *Attorney, Agent, or Firm* — Gudrun E. Huckett

(57) ABSTRACT

The cutting knife has a base member with first and second faces. One face has a topographic disturbance element arranged between knife edge and longitudinal center axis and shaping the elevation profile of the face. On the opposite face relative to the center plane an opposite elevation profile with contour line is formed. The contour line points of the contour line of the first elevation profile are positioned opposite the contour line points of the opposite contour line on perpendiculars to the center plane. The contour line of the first elevation profile and the opposite contour line are noncongruent. The contour line of the first elevation profile extends transversely to the longitudinal center axis of the base member across the disturbance element and has an ascending line section and a descending line section. A turning point positioned between these line sections is a component of the disturbance element.

20 Claims, 16 Drawing Sheets

(56) References Cited

U.S. PATENT DOCUMENTS

| | | | | |
|---|---|---|---|---|
| 6,249,978 B1 * | 6/2001 | Sheldon | ............... | A01D 34/736 |
| | | | | 30/276 |
| 7,290,383 B2 * | 11/2007 | Harris | .................. | A01D 34/736 |
| | | | | 56/255 |
| 8,640,588 B2 * | 2/2014 | Strader | ................ | A01D 34/733 |
| | | | | 30/276 |
| 2001/0003935 A1 * | 6/2001 | Morabit | ............. | A01D 34/4168 |
| | | | | 83/13 |
| 2017/0208740 A1 * | 7/2017 | Gunther | ............... | A01D 34/733 |

* cited by examiner

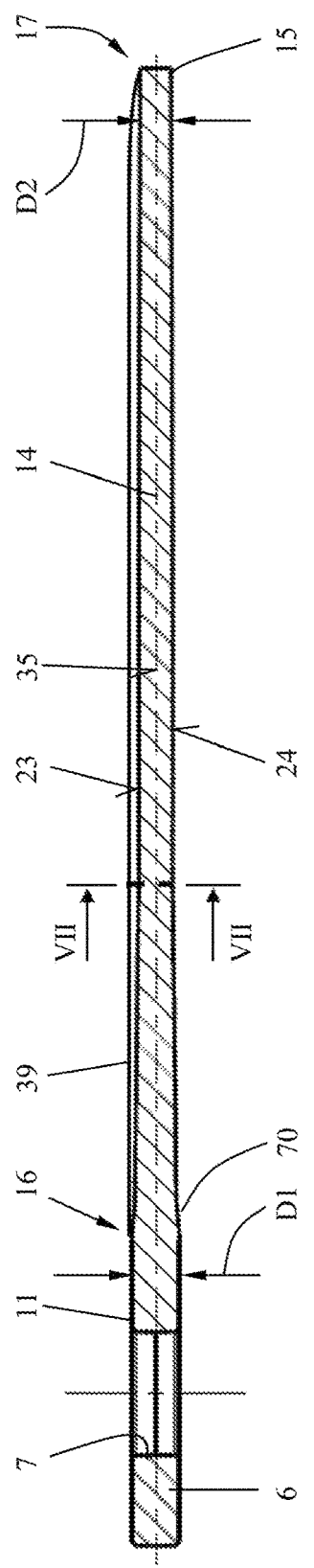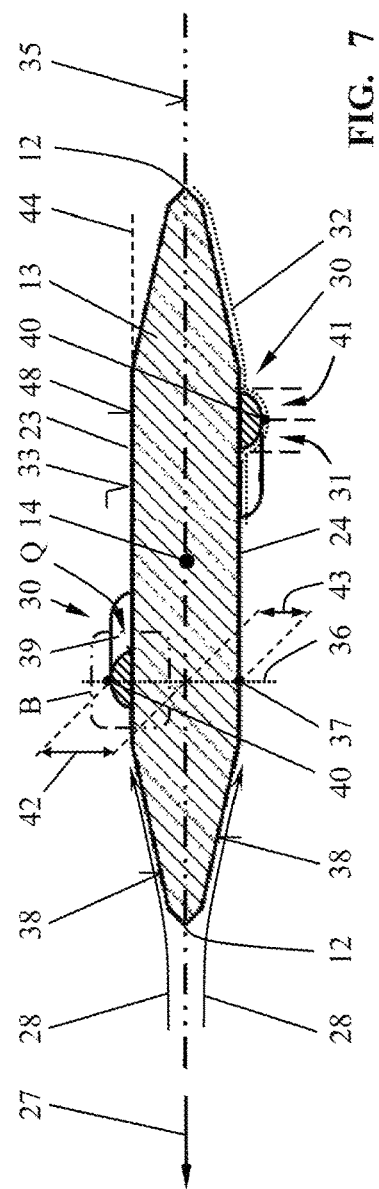

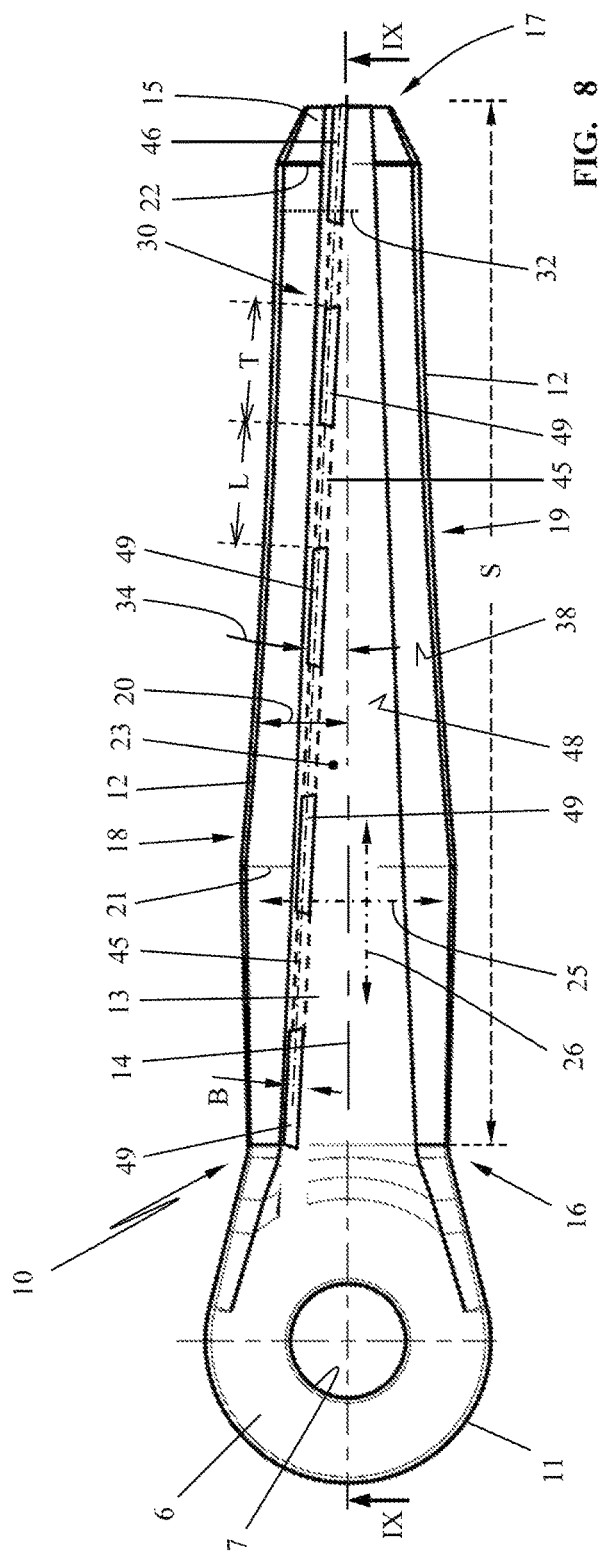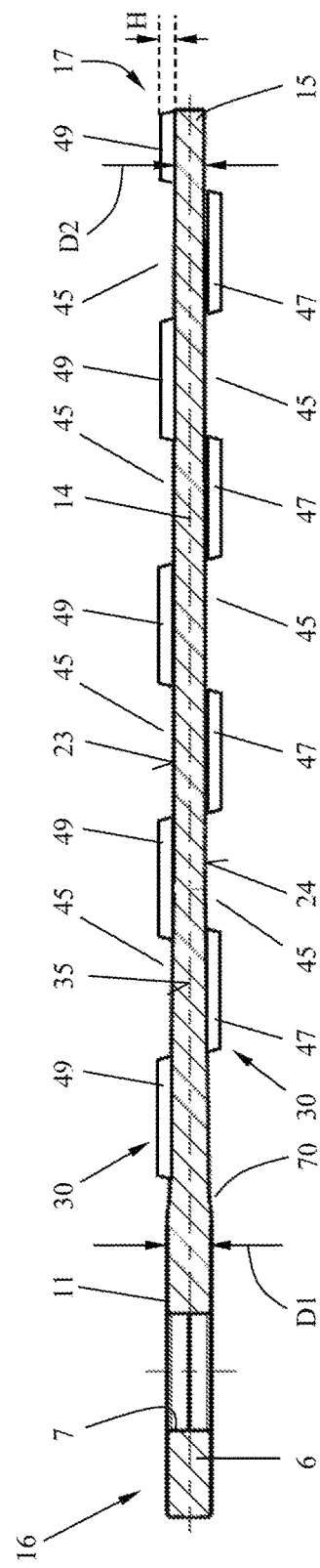

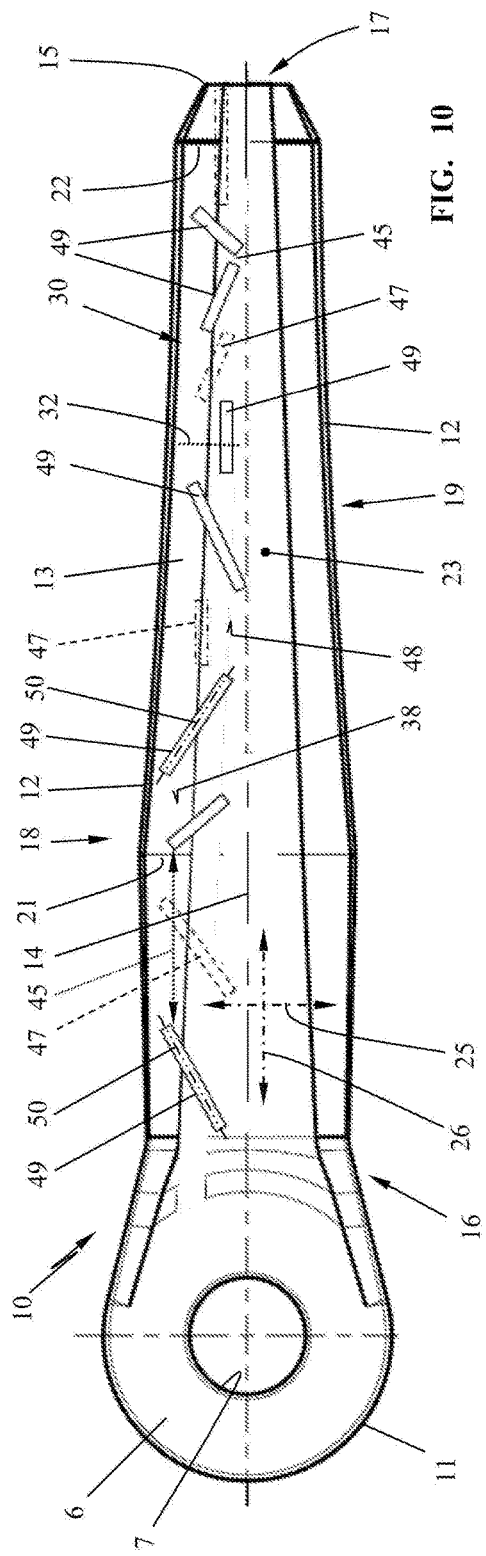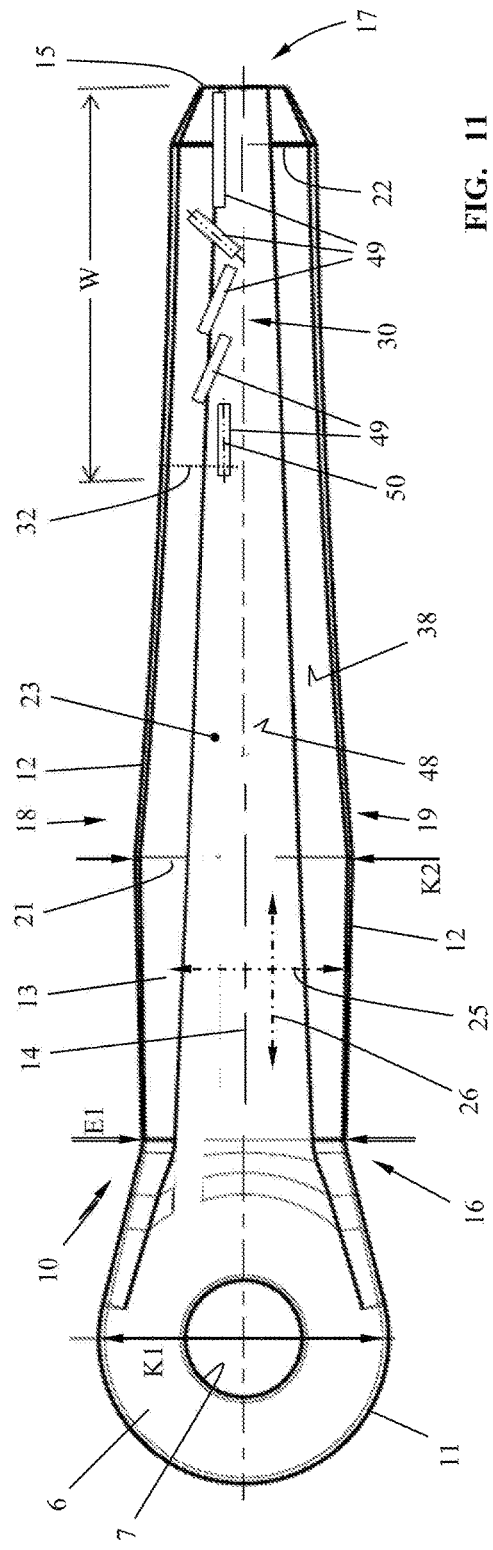

CUTTING KNIFE FOR A CUTTING HEAD OF A TRIMMER

BACKGROUND OF THE INVENTION

The invention relates to a cutting knife for a cutting head of a trimmer. The cutting knife is comprised of a flat elongate base member that has a longitudinal center axis extending from a first end to a second end of the base member. The base member has longitudinal edges extending at a spacing to the longitudinal center axis from the first end to the second end of the base member. The base member has a first face and a second face between which a center plane is positioned, wherein the faces each are delimited in a first direction transverse to the longitudinal center axis by the longitudinal edges and, in a second direction along the longitudinal center axis, by the first end and the second end of the base member. On the first end of the base member, a fastening contour for mounting the cutting knife on the cutting head is provided. The second end of the base member comprises a free knife end of the cutting knife and a knife edge is formed on at least one longitudinal edge of the base member.

Such cutting knives, referred to on the market also as polycut knives, are generally known and exhibit a good cutting behavior and have a long service life.

There are, for example, three cutting knives arranged about the circumference of a cutting head and are spaced apart from each other in the circumferential direction at the same angular spacing relative to each other, wherein the cutting knives are pivotable about a pivot axis in the cutting plane of the cutting knife. When the cutting head rotates, the cutting knives align approximately radially relative to the rotation axis of the cutting head about the pivot axis and a leading knife edge of the cutting knives engage the material to be cut.

The cutting knife is comprised of a flat elongate base member that has a longitudinal center axis extending from the first end to the second end of the base member. The base member comprises longitudinal edges extending at a spacing to the longitudinal center axis from the first end to the second end of the base member. The base member moreover comprises a first upper face (top face) and a second lower face (bottom face). The faces each extend between the longitudinal edges of the base member in a first direction transverse to the longitudinal center axis and, in a second direction along the longitudinal center axis, from the first end to the second end of the base member. On the first end of the base member, the fastening contour for mounting the cutting knife on the cutting head is provided. The second end of the base member forms a free knife end of the cutting knife. A knife edge is formed on at least one longitudinal edge of the base member.

The cutting head with the cutting knives rotates at a speed of up to 12,000 RPM. In a load-free state, the rotary speed can even be higher. As a function of the rotary speed, the cutting knife that is circulating on a circular path generates a noise that is annoying and irritating, in particular in the load-free state of the cutting head.

The invention has the object to configure a cutting knife for a cutting head of a trimmer in such a way that the noise excitation of the cutting knife is reduced, in particular at high rotary speeds.

SUMMARY OF THE INVENTION

This object is solved according to the invention by means of the following features:

at least one of the faces comprises at least one topographic disturbance element in an area between the knife edge and the longitudinal center axis of the base member;

the topographic disturbance element shapes the elevation profile of the at least one face;

a contour line of the first elevation profile of the at least one face extends transversely to the longitudinal center axis of the base member from the knife edge in the direction toward the longitudinal center axis across the disturbance element;

on the oppositely positioned face, positioned oppositely relative to the center plane, an oppositely positioned elevation profile is provided, wherein a contour line of the oppositely positioned elevation profile extends from the knife edge in the direction toward the longitudinal center axis;

contour line points of the contour line of the first elevation profile are positioned opposite the contour line points of the oppositely positioned contour line of the oppositely positioned elevation profile on perpendiculars to the center plane of the base member;

the contour line of the first elevation profile on the at least one face and the oppositely positioned contour line on the oppositely positioned face are noncongruent;

the contour line of the first elevation profile in the area of the disturbance element comprises a first ascending line section and a second descending line section; and at least one turning point positioned between these line sections of the contour line is a part of the disturbance element.

According to the invention, on at least one face of the base member of the cutting knife, at least one topographic disturbance element is provided on the face in an area between the knife edge that is active in operation and the longitudinal center axis of the base member. The topographic disturbance element shapes the elevation profile of this face. A contour line of the elevation profile extends across the disturbance element transversely to the longitudinal center axis of the base member in a direction from the knife edge of the cutting knife to the longitudinal center axis of the base member. On the oppositely positioned face, oppositely positioned relative to the center plane of the base member, an oppositely positioned elevation profile is formed which is different from the elevation profile of the first face. A contour line of the oppositely positioned elevation profile extends from the knife edge in the direction toward the longitudinal center axis, wherein at least a number of contour line points of the contour line of the first elevation profile are positioned opposite the contour line points of the oppositely positioned contour line of the oppositely positioned elevation profile on perpendiculars to the center plane of the base member. The contour line of the first elevation profile on the at least one face and the oppositely positioned contour line on the oppositely positioned face are noncongruent in this context. In the area between the knife edge that is active in operation and the longitudinal center axis of the base member, the contour line of the first face extends differently than the oppositely positioned contour line on the second oppositely positioned face because of the presence of the at least one disturbance element.

The contour line of the first elevation profile on the at least one face of the base member comprises in the area of the disturbance element an ascending line section and a descending line section. At least one turning point of the gradient that is positioned between the line sections of the contour line forms in this context a part of the disturbance element itself. A disturbance element comprises at least an ascending line section and a descending line section. In this context, an intermediate section can be formed between the ascending and descending line sections. The points which are located at the transition from the ascending line section or the descending line section into the intermediate section are turning points within the context of the instant invention. A turning point is a location of the contour line that is located at the transition between the ascending line section and the descending line section as well as a location that is located at the transition between the ascending line section or descending line section and the intermediate section. Also, a mathematically non-differentiable transition from an ascending into a descending line section, or in opposite direction, is a turning point in the context of the instant invention.

In the context of the invention, a disturbance element, or disturbance member, can be provided only on the upper face, only on the lower face, or on both faces of the base member. Important in regard to the configuration of the cutting knife according to the invention is a constructively provided asymmetry of the cross section configuration of the base member relative to the center plane.

Due to this asymmetric configuration, it is achieved that the air flowing across the faces of the cutting knife is disturbed in its flow in the area of the topographic disturbance element so that, for example, on the upper face provided with a disturbance element, a different flow behavior results compared to the oppositely positioned lower face of the cutting knife which preferably does not comprise a disturbance element or comprises a disturbance element at a different location. The constructively provided disturbance element effects as a whole flow conditions on the cutting knife which significantly lower the noise emission of a rotating cutting knife. The cutting knife according to the invention for a cutting head of a trimmer exhibits only a minimal noise emission even at high rotational speeds.

In a further embodiment of the invention, the base member comprises a center plane which is positioned between the first face and the second face. The turning point of the topographic disturbance element which is located between the line sections of the contour line comprises a spacing relative to the center plane measured on a perpendicular to the center plane. A reference point of the second face, positioned directly opposite the turning point relative to the same perpendicular to the center plane, comprises a reference spacing (second spacing) to the center plane. The first spacing of the turning point is unequal to the reference spacing (second spacing) of the reference point relative to the center plane.

Expediently, the first spacing and the reference spacing (second spacing) differ from each other by a spacing difference of up to ±100%. An absolute value of the spacing difference can be in the range of 0.2 mm to 2 mm.

In a further embodiment of the invention, it is provided that the knife edge is formed by a longitudinal edge of an edge surface and the edge surface together with a knife back surface forms the face of the base member. In this context, the arrangement is provided such that, in plan view of the base member, the knife back surface is divided by the longitudinal center axis of the base member and the topographic disturbance element is positioned in an area between the edge surface and the longitudinal center axis of the base member.

Expediently, the disturbance element extends along the knife edge and comprises a width measured transversely to the knife edge.

In a first embodiment, the disturbance element can be designed as an elevation which is projecting from the face. Expediently, the disturbance element can also be designed as a recess which is designed as a depression in the face. The disturbance element is advantageously designed as a longitudinal rib or as a longitudinal groove.

The longitudinal rib which is extending straight or the longitudinal groove which is extending straight is positioned relative to the longitudinal center axis of the base member at an angle in the range of 0° to 10°. The angle is preferably within a range of 2° to 4°.

The disturbance element which is topographically embodied as a longitudinal groove and/or longitudinal rib extends from the first end of the base member to the free knife end. Preferably, the longitudinal groove and/or longitudinal rib extends without interruption from the first end of the base member to its second end.

The topographic disturbance element in the form of a longitudinal rib and/or a longitudinal groove expediently tapers off at the free knife end.

In a preferred embodiment of the invention, the base member of the cutting knife is made of plastic material, in particular of reinforced plastic material such as glass-fiber reinforced plastic material.

Further features result from the additional claims, the specification, and the drawings in which embodiments of the invention are illustrated that will be explained in the following in more detail.

BRIEF DESCRIPTION OF THE DRAWING

FIG. 6 is a section view of the cutting knife along the section line VI-VI of FIG. 5.

FIG. 7 is a section view of the base member of the cutting knife along the section line VII-VII of FIG. 6.

FIG. 8 is a plan view of a further embodiment of the cutting knife according to the invention.

FIG. 9 is a section view of the cutting knife along the section line IX-IX of FIG. 8.

FIG. 10 is a plan view of a further embodiment of a cutting knife according to the invention with straight disturbing elements in different orientation.

FIG. 11 is a plan view of a further embodiment of the cutting knife according to the invention with disturbance elements that are arranged only in the end section of the cutting knife.

DESCRIPTION OF THE PREFERRED EMBODIMENTS

Figure 1:
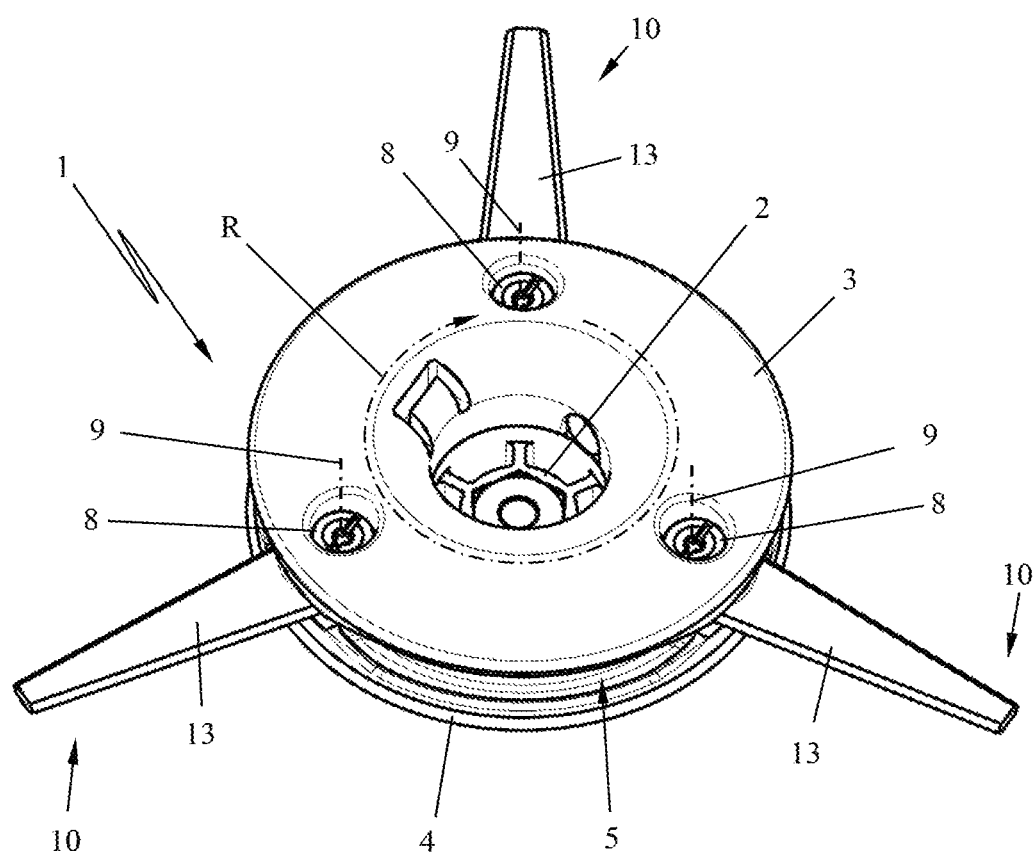
FIG. 1 is a perspective view of a cutting head of a trimmer with mounted cutting knives.

FIG. 1 illustrates a cutting head 1 which comprises a central receptacle 2 for mounting the cutting head 1 on a rotary drive shaft of a trimmer. The cutting head 1 is comprised of a top head part 3 and a bottom head part 4 which are connected fixedly to each other. Between the head parts 3 and 4 a circumferentially extending groove 5 can be formed in which a fastening end 6 (FIG. 2) of a cutting knife 10 is inserted. The fastening end 6 comprises in the illustrated embodiment a fastening section 11 with fastening contour comprising a through hole 7 for receiving a fastening bolt 8. The fastening bolt 8 penetrates the through hole 7 and is fixedly screwed with its threaded end into the bottom head part 4. In the embodiment, the cutting knife 10 is pivotable about the fastening bolt 8 about the pivot axis 9. Other mounting possibilities of the cutting knife 10 on the cutting head 1 can be expedient. The pivot axis 9 has a radial spacing relative to the center of the receptacle 2 of the cutting head 1. Depending on the realized fastening action of the cutting knife 10 on the cutting head 1, the pivot axis 9 can extend through the cutting knife 10 or can be positioned at a spacing to the cutting knife 10.

When the cutting head 1 is rotating in rotational direction R, the cutting knives 10 align themselves approximately radially relative to the receptacle 2 of the cutting head 1 as a result of the acting centrifugal force and of the movability about the pivot axis 9. By means of a knife edge 12 of the cutting knife 10 which is leading in the rotational direction R, the material to be cut can then be mowed.

The cutting knives 10 that are illustrated schematically in FIG. 1 are illustrated in more detail in FIGS. 2 through 11.

Figure 2:
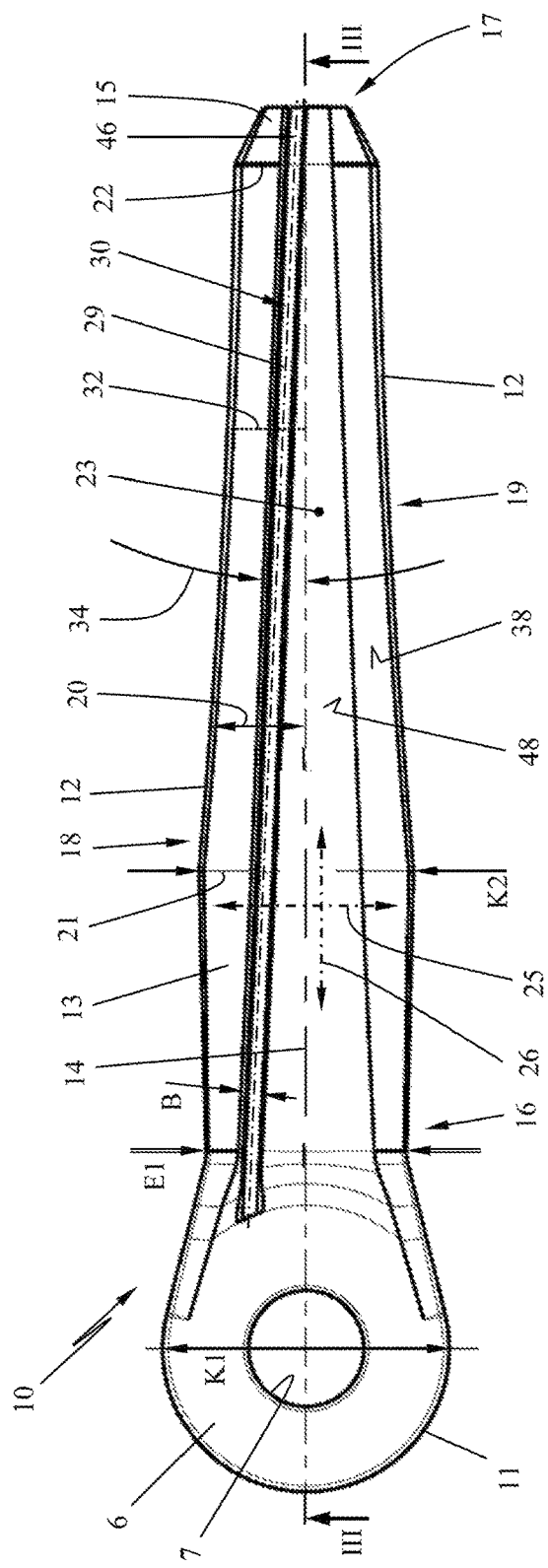
FIG. 2 is a plan view of a cutting knife according to the invention.
Figure 3:
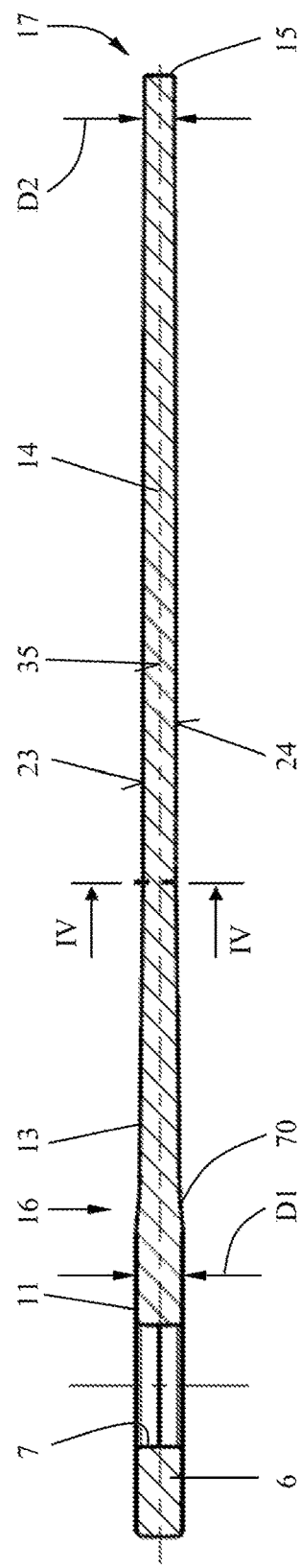
FIG. 3 is a section view of the cutting knife along the section line III-III of FIG. 2.
Figure 4:
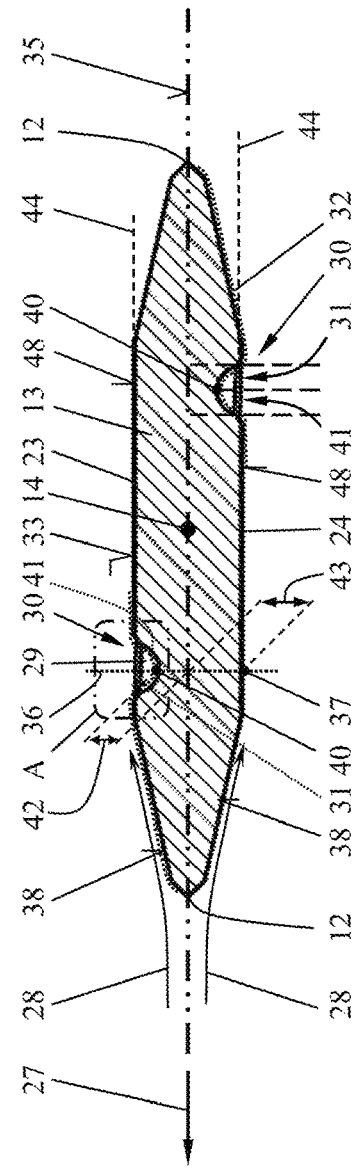
FIG. 4 is a section view of the base member of the cutting knife along the section line IV-IV of FIG. 3.
Figure 5:
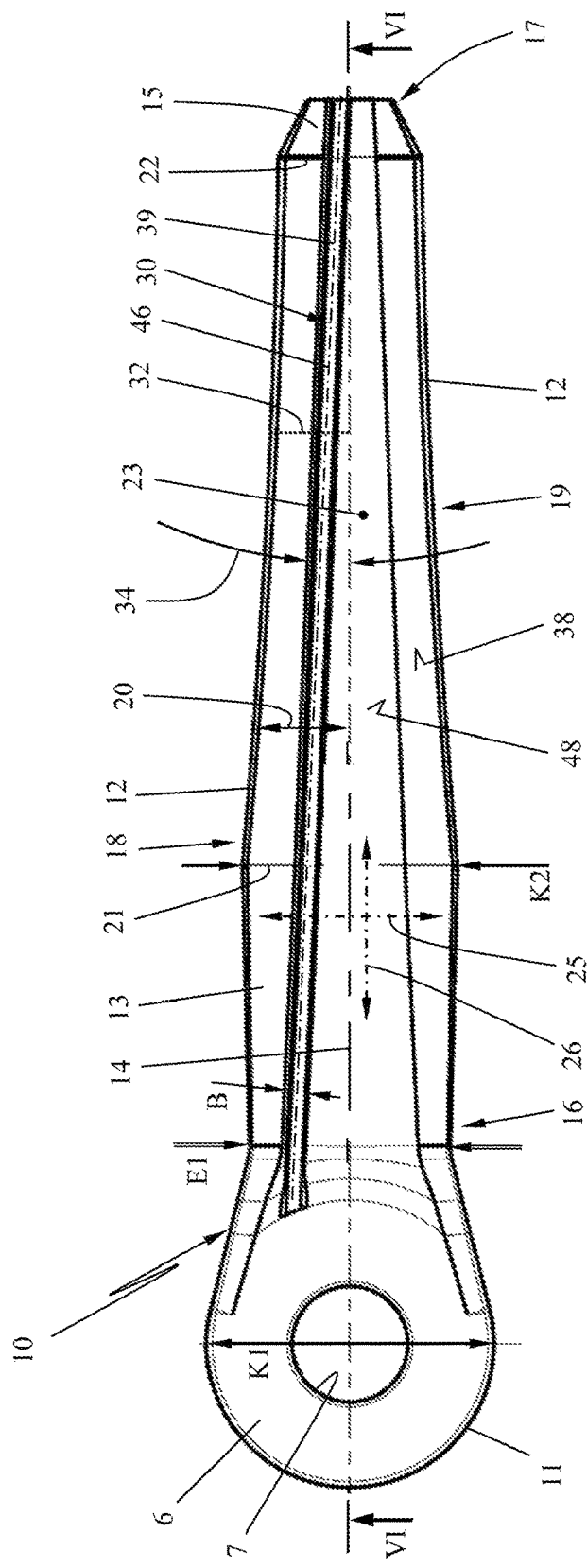
FIG. 5 is a plan view of the cutting knife according to the invention in a further embodiment.
Figure 25:
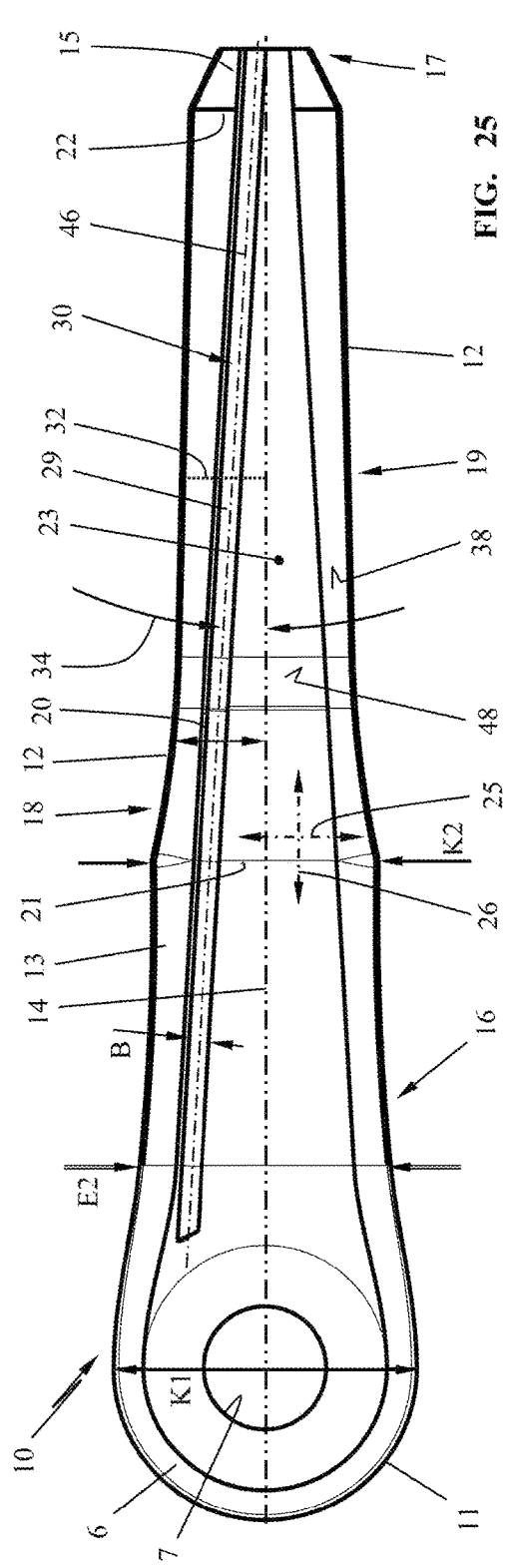
FIG. 25 is a plan view of a further embodiment of the cutting knife according to the invention.
Figure 26:
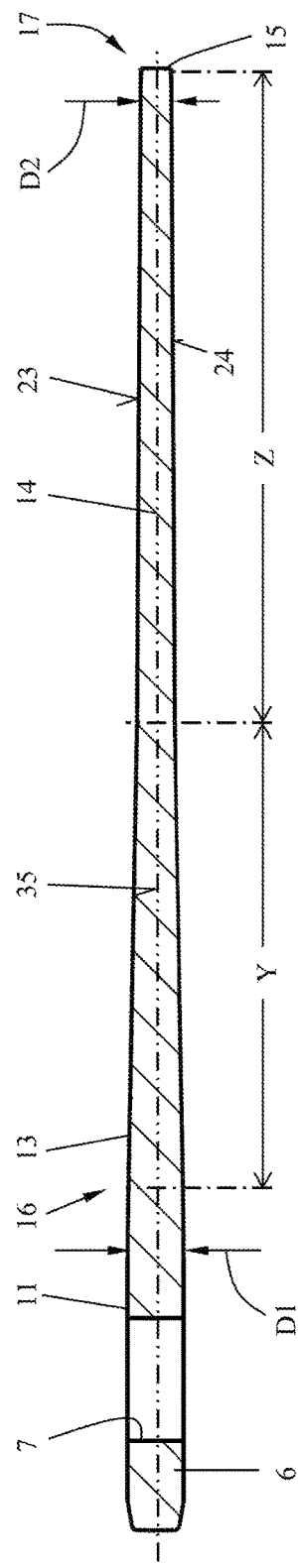
FIG. 26 shows a section of the cutting knife according to FIG. 25 in an illustration according to FIG. 3.

FIGS. 2 through 4 show a first embodiment and FIGS. 5 through 7 a second embodiment, while FIGS. 8 and 9 show a third embodiment and FIGS. 10 and 11 a fourth and a fifth embodiment of a cutting knife according to the invention, respectively. FIGS. 25 and 26 show a further embodiment of a cutting knife according to the invention. The basic construction of the cutting knife 10 is identical for all embodiments so that for same parts same reference characters are employed in the drawings. The design features of the cutting knife and its constructive details described with reference to one of the embodiments apply in the same way also to the other embodiments. The features described in regard to one of the embodiments can also be applied in another embodiment or can be combined with features of another embodiment.

The cutting knife 10 comprises preferably a flat elongate base member 13 as illustrated in plan view in FIGS. 2, 5, 8, 10, 11, and 25. The cross section of the base member 13 is illustrated in an exemplary fashion in FIGS. 4 and 7. In deviation from the illustrated cross section shape, droplet-shaped, lens-shaped, diamond-shaped or other cross section shapes can be provided. Also, mixed forms of the aforementioned cross section shapes can be expedient. According to the invention, an elongate base member 13 is to be understood as a base member whose length is several times longer than its width. According to the invention, a flat base member 13 is to be understood as a base member whose width is longer, in particular several times longer, than its thickness. The base member 13 according to the embodiment is advantageously 5 times to 10 times longer than its width and 25 times to 35 times longer than its thickness. The base member 13 according to the embodiment is advantageously 5 times to 10 times wider than thick.

The elongate base member 13 comprises a longitudinal center axis 14 which extends from a first end 16 to a second end 17 of the base member 13. The base member 13 comprises moreover longitudinal edges 18, 19 which extend, at a spacing 20, transversely to the longitudinal center axis 14. In this context, the longitudinal edges 18 and 19 extend from the first end 16 of the base member 13 to the second end 17 of the base member 13. The spacing 20 can vary across the length of the base member 13. In the illustrated embodiment, the base member 13 in plan view has a first section 21 of greatest width as well as a second section 22 of smallest width. The first section 21 is closer to the first end 16, i.e., closer to the fastening end 6 of the cutting knife 10. The second section 22 of smallest width is positioned near the second end 17 of the base member 13 which forms the free knife end 15.

The first end 16, the second end 17, as well as the longitudinal edges 18 and 19 extending from the first end 16 to the second end 17 delimit a first face 23 as well as a second face 24. As shown in FIG. 2 and FIG. 3, the first face 23 can form an upper (top) face 23 of the base member 13 and the second face 24 can form a lower (bottom) face 24 of the base member 13. Each face 23, 24 extends in a first direction 25 transversely to the longitudinal center axis 14 between the longitudinal edges 18 and 19 and extends in a second direction 26, oriented along the longitudinal center axis 14, from the first end 16 to the second end 17 of the base member 13.

On at least one of the longitudinal edges 18, 19, a knife edge 12 is formed. In the illustrated embodiment, on both longitudinal edges 18 and 19 a knife edge 12 is formed. Such a cutting knife 10 forms a reversible knife where either the knife edge (cutting edge) 12 of the longitudinal edge 18 or the knife edge (cutting edge) 12 of the other longitudinal edge 19 can be used in operation of the cutting head 1. Depending on the mounting position of the cutting knife 10 and the rotational direction of the cutting head 1, the knife edge 12 of the longitudinal edge 18 or the knife edge 12 of the longitudinal edge 19 is active. In the following, the knife edge 12 which is leading in rotational direction R and which is in engagement with the material to be cut is referred to also as active knife edge 12.

As can be seen in particular in FIGS. 4 and 7, at least one topographic disturbance element 30 is provided in an area between the knife edge 12 and the longitudinal center axis 14 of the base member 13. When looking at FIG. 2 and FIG. 4 as well as FIG. 5 and FIG. 7, it is apparent that by means of the topographic disturbance element 30 the elevation profile 33 of the face 23 or 24 of the base member 13 is determined. Such a disturbance element 30 can be formed integrally with the base member 13 or can be added as an attachment to the base member 13.

Figure 4A:
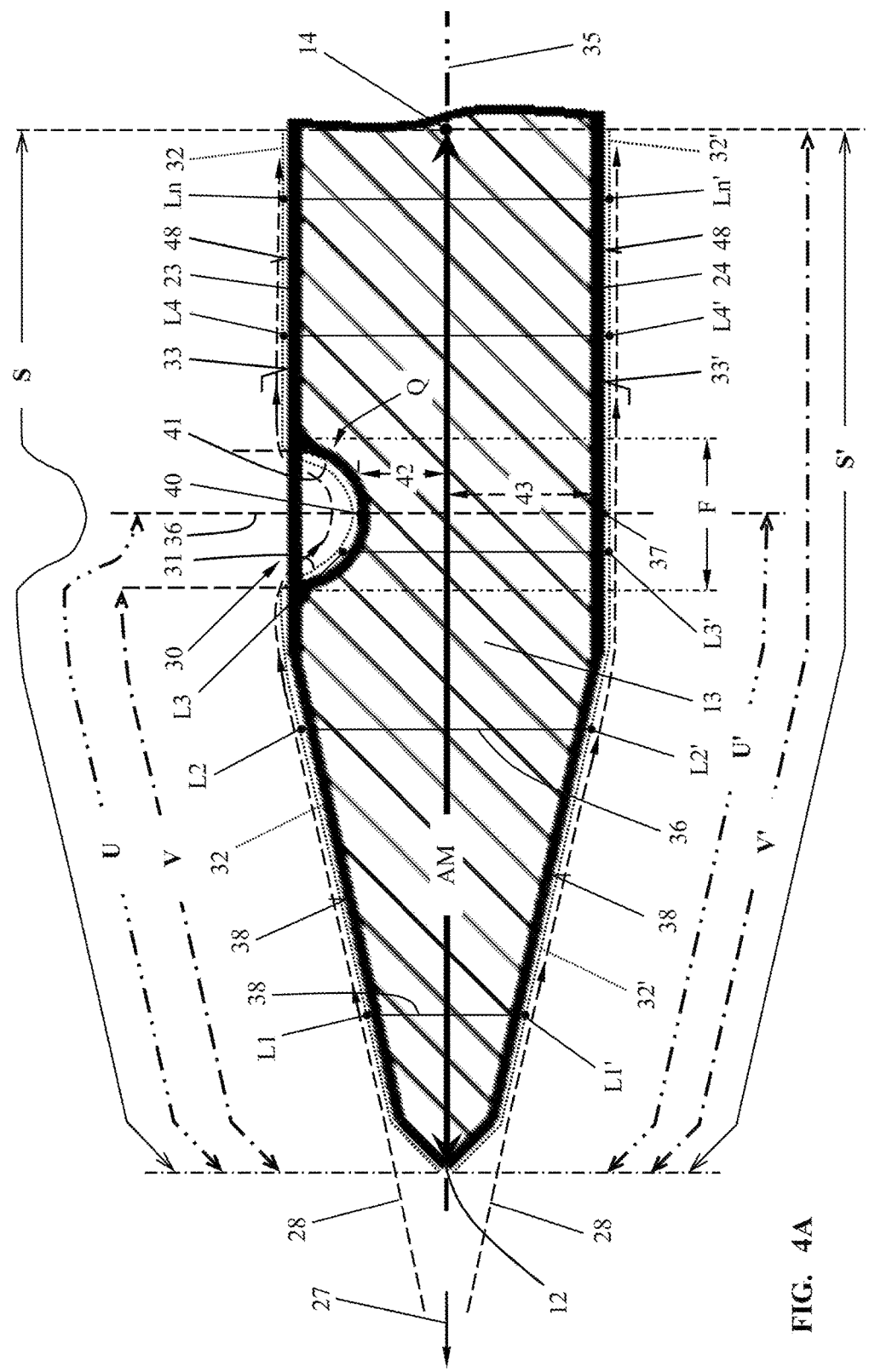
FIG. 4A is an enlarged illustration of a schematic section view of the knife section that is active in operation of the trimmer.

In FIGS. 4 and 4A, at the top to the left and at the bottom to the right a contour line 32 of the elevation profile 33 as well as a contour line 32' of the elevation profile 33' are illustrated in dotted line, respectively. The contour line 32 extends transversely to the longitudinal center axis 14 of the base member 13 from the knife edge 12 to the longitudinal center axis 14 across the disturbance element 30 (see FIG. 2). This contour line 32 (see FIG. 4) comprises in the area of the disturbance element 30 a descending line section 31 and an ascending line section 41 which directly adjoins the descending line section 31 in this embodiment. The descending line section 31 passes through a turning point 40 into the ascending line section 41. This point of the contour line 32 positioned between the line sections 31 and 41 is part of the disturbance element 30 and in the meaning of the invention is referred to as turning point 40. The turning point 40 is characterized in that the gradient of the contour line 32 at the turning point 40 is zero.

The line section in the area of the disturbance element 30 which is extending in the direction from the knife edge 12 toward the longitudinal center axis 14 and, in this direction, descends toward the center plane 35 of the base member 13 is to be understood as a descending line section 31. The sequential points of the descending line section 31 exhibit a decreasing point distance relative to the center plane 35 along the line section 31.

The line section in the area of the disturbance element 30 which is extending in the direction from the knife edge 12 toward the longitudinal center axis 14 and, in this direction, ascends relative to the center plane 35 of the base member 13 is to be understood as an ascending line section 41. The sequential points of the ascending line section 41 exhibit an increasing point distance relative to the center plane 35 along the line section 41.

Relative to the incoming air which is flowing in the direction of arrow 28, the first line section 31 is the descending line section. The second line section 41 is the ascending line section. The contour line comprises at least one turning point 40, which is at the same time a minimum, between the line sections 31, 41. In the embodiment according to FIG. 4, the first line section 31 passes immediately and without any spacing into the second line section 41 at the turning point 40. A single turning point is formed.

In the embodiment according to FIG. 7, relative to the incoming air which is flowing in the direction of arrow 28, the first line section 41 is the ascending line section. The second line section 31 in this embodiment is the descending line section. Between the line sections 31, 41, at least one turning point 40 is located which is at the same time a maximum. In the embodiment according to FIGS. 4 and 4A, the first line section 41 immediately passes into the second line section 31 at the turning point 40. A single turning point is formed.

As illustrated with the aid of the further cross section illustrations of FIGS. 12 through 19 and as described in the following in detail, a configuration with a plurality of turning points 40, 40', 40" is possible also.

When the profile of the cutting knife 10 according to FIGS. 4 and 4A is moved in the direction of arrow 27 on a circular path, the incoming air in accordance with arrows 28 will flow across the illustrated profile of the cutting knife 10. In this context, the flow path of the air that is flowing across the first face 23 (in the embodiment the top face) of the base member 13 is disturbed by the topographic disturbance element 30 while the air flowing across the second face 24 (in the embodiment the lower or bottom face) of the base member 13 can flow substantially without disturbance in the area of the face 24 that is positioned opposite the first face 23 on a perpendicular. Flow separation of air swirls is constructively forced at the first face 23 by the position and arrangement of the disturbance element 30 in an area between an active knife edge 12 and the longitudinal center axis 14 while the air can flow across the second face 24 without disturbance, in particular across the entire area between the active knife edge 12 and the longitudinal center axis 14. Flow separation of air swirls takes place at the second (bottom) face 24 later than on the first (top) face 23 (or vice versa), in particular after passing the longitudinal center axis 14. Due to this constructive configuration, the moving cutting knife 10 exhibits a reduced noise excitation and, in operation of the trimmer, is significantly quieter than a comparable cutting knife 10 without topographic disturbance element 30.

According to FIGS. 4 and 7, the disturbance element 30 effects a constructive non-symmetric cross section shape of the base member 13 between active knife edge 12 and longitudinal center axis 14. The leading partial section AM (see FIG. 4 and FIG. 4A) of the cutting knife 10, which extends from the active knife edge 12 to the longitudinal center axis 14, has different elevation profiles 33, 33' at the upper and lower faces 23, 24. The contour line 32 of the elevation profile 33 of the first upper face 23 has between active knife edge 12 and longitudinal center axis 14 a different course than the contour line 32' of the elevation profile 33' of the second lower face 24. A disturbance element 30 arranged on the first face 23 has no additional disturbance element arranged opposite thereto at the same level on the second face 24; this is shown in particular in the cross section views according to FIGS. 4, 4A, and 7. Opposite the disturbance element 30 of the first face 23, there is no disturbance element positioned on the second face 24 on a perpendicular 36 to the center plane 35 of the base member 13. The reference point 37 is positioned in the plane 44 of the knife back surface 48 and forms no disturbance element for the air flowing across in flow direction of arrow 28. The area F (FIG. 4A) of the second face 24 that is opposite the disturbance element 30 of the first face 23 is free of disturbance elements.

Opposite a disturbance element 30 arranged on the face 23, in principle a disturbance element of a different size or different cross section, or no disturbance element at all, can be positioned on the other face 24 at the same level as the disturbance element 30.

The noise reduction is in particular obtained by the asymmetric cross section shape (FIG. 4A) of the active knife half AM. A contour line 32 of the first elevation profile 33 on the (upper) face 23 extends transversely to the longitudinal center axis 14 of the base member 13 from the knife edge 12 in the direction toward the longitudinal center axis 14 across the disturbance element 30 arranged on the (upper) face 23. On the oppositely positioned face 24, positioned opposite the face 23 relative to the center plane 35, an oppositely positioned elevation profile 33' is formed, wherein a contour line 32' of the oppositely positioned elevation profile 33' extends from the knife edge 12 in the direction toward the longitudinal center axis 14. The contour line points L1, L2, L3, L4, Ln of the contour line 32 of the first elevation profile 33 have positioned opposite thereto contour line points L1', L2', L3', L4', Ln' of the opposite contour line 32' on perpendiculars 36 to the center plane 35 of the base member 13. The configuration is such that the contour line 32 of the first elevation profile 33 on the at least one (upper) face 23 and the oppositely positioned contour line 32' on the oppositely positioned face 24 are noncongruent. It is not possible to superimpose the contour lines 32, 32' to be congruent with each other by displacement, by mirroring, by rotation or any other method.

Advantageously, between the active knife edge 12 and the longitudinal center axis 14 a single disturbance element 30 is positioned either on the first upper face (top face) 23 or the second lower face (bottom face) 24. It can also be expedient to arrange adjacent to the disturbance element 30 an additional disturbance element on face 23 or 24. Such an additional disturbance element is positioned expediently in the width direction of the cutting knife 10 at a spacing from the first disturbance element 30. The spacing of the additional disturbance element from the first disturbance element 30 corresponds at least to the width of the first disturbance element 30. Advantageously, the spacing corresponds to a multiple of the width of the disturbance element 30. The flows on top side and bottom side of the cutting knife 10 will be different so that a noise reduction can be achieved.

The topographic disturbance element 30, as shown in the embodiment according to FIGS. 2 to 4 and 4A, can be designed as a recess which forms a depression in the face 23 or 24. The depression in the face 23 or 24 can also be embodied to be locally limited.

In the embodiment according to FIGS. 5 to 7, the topographic disturbance element 30 is an elevation that, as shown in FIGS. 6 and 7, projects from the face 23 or 24. The elevation on the face 23 or 24 can also be embodied to be locally limited.

In the embodiment according to FIGS. 2 through 4 and FIG. 4A, the topographic disturbance element 30 is designed as a longitudinal groove 29. In the embodiment according to FIGS. 5 to 7, the topographic disturbance element 30 is designed as a longitudinal rib 39. The disturbance element 30 can also be a combination of elevations and recesses.

The topographic disturbance element 30 can be designed such that it extends along the knife edge 12 at least across a partial length of the knife edge 12. Expediently, the topographic disturbance element 30 has a width B that is measured transverse to the knife edge 12. The width B of the disturbance element 30 is advantageously smaller than one fourth, in particular one sixth, of the width of the cutting knife 10. The extension of the disturbance element 30 in the width direction is advantageously smaller than or identical to three times, in particular two times, the extension of the disturbance element 30 in height direction.

The topographic disturbance element 30 which is formed as a longitudinal groove 29 or longitudinal rib 39 is designed in the embodiment preferably as a straight element and extends preferably along a line 46. This line 46 can be positioned relative to the longitudinal center axis 14 at an angle 34 which has a size in the range of 0° to 10°. Preferably, the angle 34 has a size between 2° and 4°.

The line 46 in the embodiments is illustrated as a straight line. It can be advantageous to arrange and/or align the disturbance elements 30 along a corrugated, curved, zigzag or interrupted line.

In the embodiments according to FIGS. 2 through 7, the topographic disturbance element 30 is expediently designed as a longitudinal groove 29 or as a longitudinal rib 39 and extends advantageously from the first end 16 of the base member 13 to the second end 17 of the base member 13 which forms the free knife end 15. The topographic disturbance element 30, in the embodiment the longitudinal groove 29 or the longitudinal rib 39, extends in this context expediently without interruption from the first end 16, provided with the fastening end 6 of the cutting knife 10, to the free knife end 15 which forms the second end 17. In a particular configuration, the topographic disturbance element 30 tapers off at the free knife end 15. In the illustration according to FIG. 2, the longitudinal groove 29 tapers off at the knife end 15. In the illustration according to FIG. 5 or FIG. 6, the longitudinal rib 39 tapers off at the free knife end 15.

As shown in FIGS. 4, 4A, and 7, the cross section of the base member 13 comprises a center plane 35 positioned between the first face 23 and the second face 24. As is apparent from FIG. 4, 4A, and 7, a turning point 40 of the topographic disturbance element 30 positioned between the line sections 31 and 41 of the contour line 32 is positioned on a perpendicular 36 to the center plane 35 at a first spacing 42 to the center plane 35. In the embodiment according to FIGS. 4 and 4A, the turning point 40 is below the plane 44 of the knife back surface 48. The turning point 40 is positioned between the plane 44 of the knife back surface 48 and the center plane 35. In the embodiment according to FIG. 7, the turning point 40 is positioned at a spacing above the plane 44 of the knife back surface 48. The turning point 40 is positioned outside of the region delimited by the plane 44 of the knife back surface 48 and by the center plane 35.

Relative to the same perpendicular 36 to the center plane 35, directly opposite the turning point 40 of one face, for example, of the first face 23, a reference point 37 of the other face, for example, of the second face 24, is positioned. The reference point 37 which is positioned on the second face 24 has a reference spacing 43 relative to the center plane 35.

In all embodiments, the first spacing 42 of the turning point 40 relative to the center plane 35 is unequal to the reference spacing 43 of the reference point 37 which is positioned directly opposite the turning point 40. The first spacing 42 and the reference spacing 43 can differ from each other by a spacing difference of up to ±100% of the reference spacing 43. The absolute value of the spacing difference can be within a range of 0.2 mm to 2 mm.

As discussed above, the knife edge 12 is formed on a longitudinal edge 18 or 19. An edge surface 38 and the knife back surface 48 together form the face 23 or 24 of the base member 13. In plan view, the knife back surface 48 is divided by the longitudinal center axis 14 of the base member 13 (FIG. 2) wherein the topographic disturbance element 30 advantageously is positioned in an area between the edge surface 38 and the longitudinal center axis 14 of the base member 13. The disturbance element 30 is thus formed on the knife back surface 48. Providing the disturbance element 30 on the edge surface 38 may be expedient.

The knife back surface 48 is embodied at least in a partial area thereof preferably as a flat plane 44, as shown in FIGS. 4, 4A, and 7. The knife back surface 48 can however be slanted expediently toward the center plane 35, for example, when the base member 13 has a diamond-shaped cross section. In the embodiment of FIGS. 2 to 7, the disturbance element 30 extends in a straight line between the ends 16 and 17 of the base member 13. It can be advantageous that the disturbance element 30 extends along a curved line between the first end 16 and the second end 17 of the base member 13.

In the embodiment according to FIGS. 8 and 9, the extension of the disturbance element 30 between the first end 16 and the second end 17 is interrupted by gaps 45. In the embodiment of FIGS. 8 and 9, the disturbance element 30 is designed as an elevation. The disturbance element 30 rises topographically from the base member 13 and has a height H that can be 0.2 mm to 2 mm.

As shown in FIG. 8 in plan view, the base member 13 has partial ribs 49 as topographic disturbance elements 30. Gaps 45 are formed between the partial ribs 49. The partial ribs 49 extend, viewed in a plan view of the base member 13, along a line 46 wherein the length T of a partial ribs 49 corresponds advantageously to the length L of a gap 45.

As can be seen in the longitudinal section view of FIG. 9, partial ribs 47 are arranged preferably also on the second face 24 and gaps 45 are formed between them. The partial ribs 47, in plan view of the base member 13, are aligned along a line 46.

Expediently, the partial ribs 49 of the face 23 are positioned opposite the gaps 45 between the partial ribs 47, relative to a perpendicular 36 to the center plane 35, respectively. The partial ribs 47 of the face 24 in section view according to FIG. 9 are positioned in alignment with the gaps 45 between the partial ribs 49 of the face 23. Advantageously, across the entire active length S of the cutting knife 10 topographic disturbance elements 30 are provided, wherein, as shown in the section view of FIG. 9, the disturbance elements 30 of the face 23 are staggered relative to the disturbance elements 30 of the face 24.

The base member 13 of the cutting knife 10 is comprised preferably of plastic material, in particular of a reinforced plastic material such as glass-fiber reinforced plastic material. The shape of the base member 13 can be designed such that the fastening section 11 at the first end 16 has a first thickness D1. The free knife end 15 at the second end 17 of the base member 13 has a second thickness D2. The second thickness D2 is smaller than the first thickness D1. At the transition from the fastening section 11 to the base member 13, advantageously a step 70 (FIG. 3, FIG. 9) is provided for reducing the thickness D1. The step 70 can be expediently rounded.

Between the fastening section 11 and the first end 16 of the base member 13, in plan view of the base member 13 according to FIG. 2, 5, or 11, a constriction with a width E1 is formed. The fastening section 11 has a first width K1 and the base member 13 a second width K2. The width K2 is a maximum width of the base member 13. The second width K2 is smaller than the first width K1 of the fastening section 11. In the illustrated embodiments according to FIG. 2, 5 or 11, the constriction has a width E1 which is smaller than the first width K1 of the fastening section 11 and smaller than the second width K2 of the base member 13.

In the embodiment according to FIG. 10, the base member 13 comprises between its first end 16 and its second end 17 topographic disturbance elements 30 which are correlated with an active knife edge 12 of the longitudinal edge 18 and are positioned in an area between the knife edge 12 and the longitudinal center axis 14 of the base member 13. The disturbance elements 30 in the embodiment according to FIG. 10 are formed as partial ribs 49 wherein the partial ribs 49 with their longitudinal axes 50 can be positioned in different orientations relative to the longitudinal center axis 14. Each partial rib 49, independent of its orientation relative to the longitudinal center axis 14 or to the knife edge 12, forms a disturbance element 30 which leads to an early flow separation of the air flow from the cutting knife 10. This early flow separation of the air flow or the early disturbance of the air flow leads to a non-uniform flow about the cutting knife so that the cutting knife according to the invention has reduced noise emission in comparison to cutting knives having a uniform flow about them.

The partial ribs 49 can be oriented parallel to the longitudinal center axis 14, positioned at a right angle to the longitudinal center axis 14, or at any angle. As can be seen in the plan view of FIG. 10, a partial rib 49 can extend from the knife back surface 48 into the edge surface 38. The disturbance elements 30 in the embodiment according to FIG. 10 are positioned between the longitudinal center axis 14 of the base member 13 and the active knife edge 12 of the longitudinal edge 18. This arrangement of the disturbance elements 30 is also expedient for all other embodiments.

In the embodiment according to FIG. 11, disturbance elements 30 are again shown which are preferably formed as partial ribs 49. The partial ribs 49 in the embodiment according to FIG. 11, in accordance with the illustration of FIG. 10, can be provided in a random arrangement and can be positioned parallel to the longitudinal center axis 14 as well as at a right angle thereto. Any other angular position of the longitudinal axis 50 of a partial rib 49 can be expedient.

In the embodiment according to FIG. 11, the arrangement of the disturbance elements 30 is limited to a partial section of the base member 13 of a length W. This can be expedient because the flow velocity of the air is increased as a result of the higher travel speed of the end section of the base member 13. In order to design a cutting knife with minimal noise emission, it may therefore be sufficient to provide an end section of the cutting knife with disturbance elements 30.

The end section with the length W in FIG. 11 corresponds approximately to one third of the active length S (FIG. 8) of the base member 13.

Gaps 45 can be provided between the partial ribs 49, as already shown in the embodiment according to FIGS. 8 and 9. While in the embodiment according to FIGS. 8 and 9 partial ribs 47 on the opposite face 24 are correlated with the gaps 45 between partial ribs 49 of the face 23, in the embodiment according to FIG. 10 a gap 45 between the partial ribs 49 on the face 23 is not completely matched to and covered or filled by a partial rib 47 on the opposite face 24.

Advantageously, at least 30%, preferably 50%, of the active length S of the knife edge 12 at the inflow side comprise a disturbance element 30 on the upper face 23 or the lower face 24. The flow in the areas without disturbance elements 30 can be influenced by neighboring disturbance elements in such a way that the noise reduction effect according to the invention is still provided.

In addition to the above Figures that illustrate exemplary disturbance elements, FIGS. 12 to 19 show differently shaped and schematically shown cross sections Q of the disturbance elements 30 according to the invention. These illustrations are examples of a plurality of possible embodiments that have in common that the incoming air flowing in the direction of arrow 28 is affected along a face 23 of the base member 13 by a disturbance element 30. The cross sections Q can be realized in all described embodiments or can also be combined with each other. All cross sections are illustrated schematically; angled transitions can also be rounded as an alternative.

A disturbance element 30 comprises at least an ascending line section 41 and a descending line section 31. The cross sections Q illustrated in FIGS. 4, 4A, and 7 pass from the ascending line section 41 directly, i.e., without intermediately positioned additional area, a so-called intermediate section, into the descending line section 31. The transition is realized in the embodiments according to FIGS. 4, 4A, and 7 immediately by a single turning point 40. The illustrated turning point 40 corresponds in these embodiments to a mathematical turning point.

Figure 12:
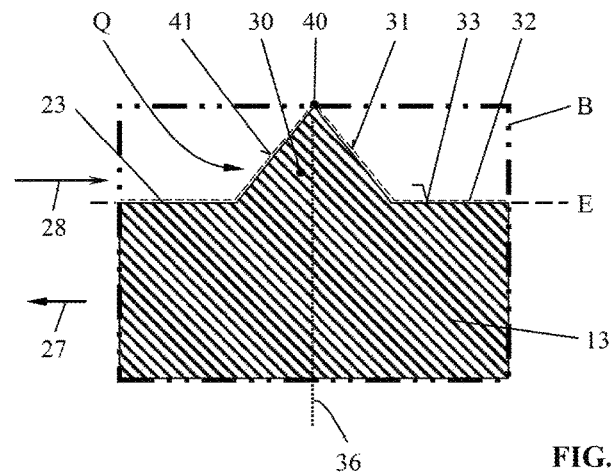
FIG. 12 is a section view in enlarged detail illustration of a raised disturbance element of a different cross section shape according to the framed detail B of FIG. 7.
Figure 13:
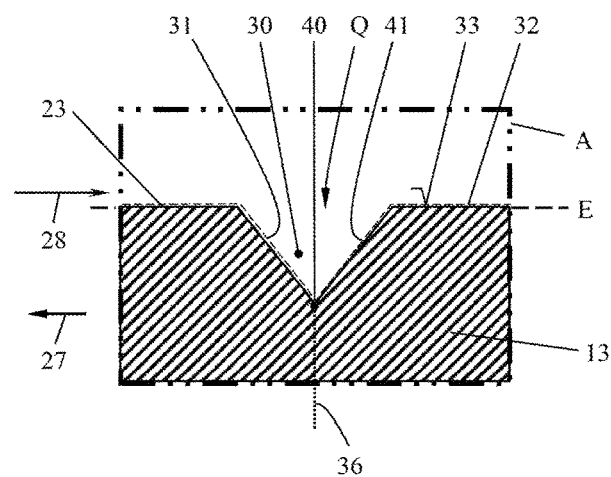
FIG. 13 is a section view in enlarged detail illustration of a disturbance element in the form of a recess in another cross section shape according to the framed detail A of FIG. 4.

The cross section Q illustrated in FIGS. 12 and 13 comprises mathematically no derivative at the transition of the ascending line section 41 into the descending line section 31; the point between the ascending and descending line sections 31, 41, in accordance with the basic principle of the invention, is still a turning point 40 because the gradient to the right and the gradient to the left of the turning point have different signs.

In the embodiment according to FIG. 12, the cross section Q of the disturbance element 30 is of a triangular shape. A triangle as illustrated is advantageous.

The incoming air flowing in the direction of arrow 28 impinges on the disturbance element 30 and is deflected along the ascending line section 41 of the contour line 32. After reaching a maximum at the turning point 40, a descending line section 31 adjoins the ascending line section 41. The descending line section 31 ends at a plane E at the same level as the ascending line section 41. The elevation profile 33 of the face 23 is thus shaped by the disturbance element 30 that is in the form of an elevation. The turning point 40 is positioned on a perpendicular 36 and has correlated therewith a reference point 37 (FIGS. 4, 7) on the opposite face 24.

In the embodiment according to FIG. 13, the face 23 is shaped by a disturbance element 30 which is configured as a depression or recess in the base member 13. The incoming air flowing in the direction of arrow 28 thus first drops along the descending line section 31 and, after having passed the turning point 40, flows along the ascending line section 41 in the direction toward the plane E. The contour line 32 of the elevation profile 33 comprises thus a depression whose lowermost point forms the turning point 40. The turning point 40 is positioned on a perpendicular 36 whose point of intersection with the oppositely arranged face, not illustrated, forms a reference point 37 (see FIGS. 4, 7).

The cross section Q of the depression in FIG. 13 corresponds to an isosceles, preferably equilateral, triangle wherein the hypotenuse of the triangle is positioned in the plane E of the top side of the face 23.

In addition to an ascending line section 41 and a descending line section 31, a disturbance element 30 may comprise also an interposed intermediate section P, K (FIGS. 14 to 19). The point or the points of the transition from the intermediate section P, K to an ascending line section 41 or a descending line section 31 are also understood as a turning point 40, 40' or 40". The intermediate section P, K can have any elevation profile. The intermediate section P, K extends advantageously straight or curved and can also be comprised of several sections. The intermediate section P, K has a length and/or width which is advantageously less than one fourth, in particular one eighth, of the knife width.

Figure 14:
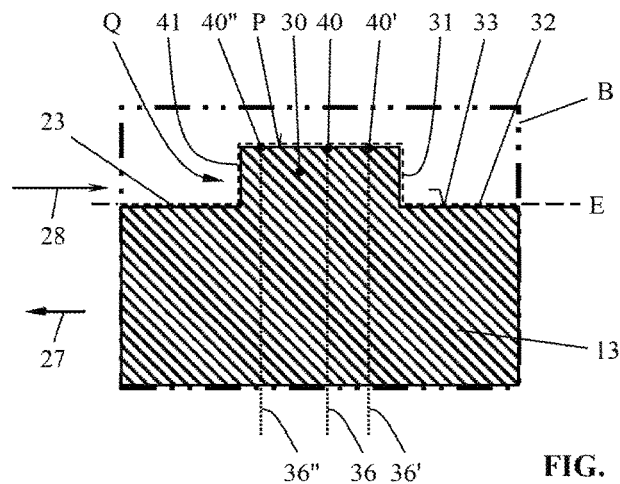
FIG. 14 is a section view in enlarged detail illustration of a raised disturbance element in another cross section shape in an illustration according to FIG. 12.

In the embodiment according to FIG. 14, the cross section Q of the disturbance element 30 is quadrangular. In the illustrated embodiment, a rectangular cross section is provided. Other proportions of the cross section may be advantageous.

The cross section rises from the plane E with an ascending line section 41 of the contour line 32 of the elevation profile 33. The ascending line section 41 is positioned relative to the plane E at a right angle. In flow direction of the air (arrow 28), a plateau P is formed downstream of the ascending line section 41 and extends to the descending line section 31. The ascending line section 41 begins at the level of the plane E. The descending line section 31 ends at the level of the plane E. In the illustrated embodiment, the plateau P is configured to be parallel to the plane E. The plateau P could also be designed as a concave or convex curvature.

When the plateau P is of a planar configuration, preferably plane-parallel to plane E, a plurality of turning points 40, 40', 40" are provided between the ascending line section 41 and the descending line section 31. All turning points 40, 40', 40" have in common that the gradient of the contour line 32 at the turning points 40, 40', 40" is zero. The plateau P is thus an area or section of the contour line 32 where the gradient of the contour line 32 is zero.

A turning point 40 is positioned on a perpendicular 36 to the center plane 35 (FIGS. 4, 7) of the base member 13. The point of intersection of the perpendicular 36 with the face 24 forms a reference point 37. Likewise, the turning point 40' is positioned on a perpendicular 36' and the turning point 40" on a perpendicular 36".

Figure 15:
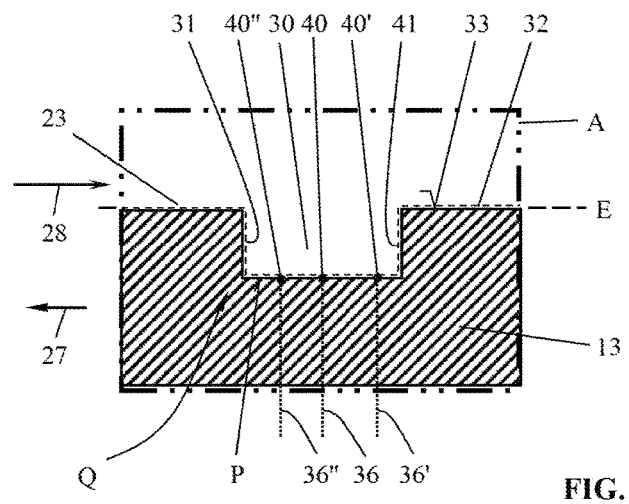
FIG. 15 is a section view in enlarged detail illustration of a disturbance element in the form of a recess in a further possible cross section shape in an illustration according to FIG. 13.

In the embodiment according to FIG. 15, a disturbance element 30 is formed with a cross section Q as a depression or recess. As explained in regard to FIG. 14, the air is flowing across the face 23 in the direction of arrow 28; the air first meets the descending line section 31 of the contour line 32 of the elevation profile 33. In the direction of arrow 28, the descending line section 31 is followed by an ascending line section 41 which ends at the plane E. As in the embodiment of FIG. 14, a plateau P is formed between the descending line section 31 and the ascending line section 41; the plateau P forms the bottom of the depression or recess of the disturbance element 30. The plateau P in the illustrated embodiment is designed as a flat surface which is positioned parallel to the plane E. A concave or convex configuration of the plateau P can be advantageous.

In the illustrated planar embodiment, on the plateau P a plurality of turning points 40, 40', 40" are positioned that have in common that the gradient of the contour line 32 at the turning points 40, 40', 40" is zero. The plateau P forms thus an area or a section of the contour line 32 in which the gradient of the contour line is zero. The plateau therefore can be referred to in the broadest meaning as a "flat" turning point.

Each one of the turning points 40, 40', 40" is positioned on a perpendicular 36, 36', 36" in accordance with the aforementioned embodiment of FIG. 14.

Figure 16:
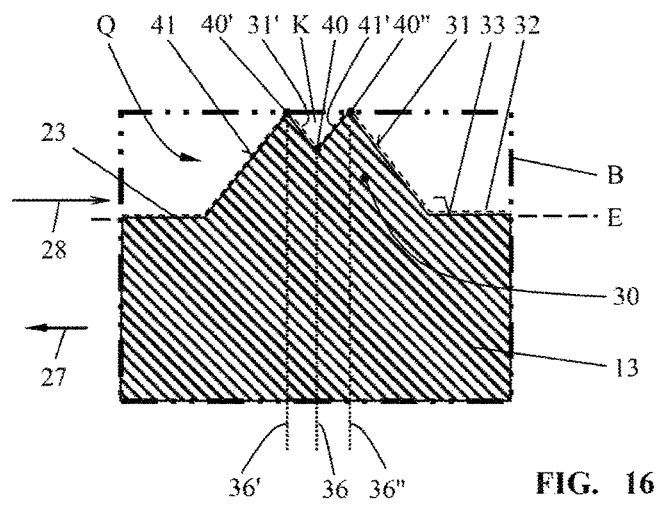
FIG. 16 is a section view in enlarged detail illustration of a raised disturbance element in a further cross section shape in an illustration according to FIG. 12, showing several turning points on a contour line extending across the disturbance element.

In the embodiment according to FIG. 16, the disturbance element 30 has a cross section Q which is substantially triangular. The triangular cross section Q has in the area of the tip a crater-shaped depression K so that several turning points 40, 40', 40" are provided by the contour line 32 of the elevation profile 33 of the disturbance element 30. As shown in FIG. 16, the incoming air flowing in the direction of arrow 28 first impinges on the ascending line section 41 of the contour line 32 until the first maximum, i.e., the turning point 40', is reached. The ascending line section 41 is adjoined by a descending line section 31' that drops into the crater K of the disturbance element 30. The ascending line section 41 has a first gradient and the descending line section 31' a second gradient, wherein the gradient is zero at the turning point 40'.

A second ascending line section 41' adjoins the first descending line sections 31' at the turning point 40 and the ascending line section 41' ascends from the crater until it reaches a further turning point 40" which, with gradient zero, passes into a descending line section 31. The turning points 40' and 40"are maxima of the contour line 32. The turning point 40 is a minimum of the contour line 32.

The ascending line section 41 rises from the plane E. The descending line section 31 ends at the plane E. The turning point 40 inside the crater K of the disturbance element 30 is positioned at a spacing above the plane E.

Figure 17:
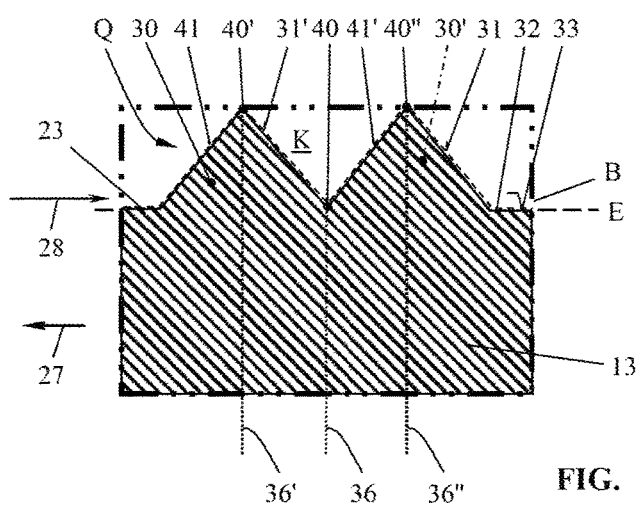
FIG. 17 is a section view in enlarged detail illustration of a raised disturbance element in an illustration according to FIG. 16, showing a further cross section shape with a distinct depression and several turning points on a contour line extending across the disturbance element.

The embodiment according to FIG. 17 corresponds in its basic configuration to that of FIG. 16. The incoming air flowing in the direction of arrow 28 impinges first on an ascending line section 41 which ascends from the plane E to a first turning point 40' which forms a maximum. The descending line section 31' adjoins the ascending line section 41 and ends at a minimum which forms the turning point 40. An ascending line section 41 adjoins the descending line section 31' and ends also at a maximum which is the turning point 40". Via the turning point 40", the ascending line section 41' passes into a further descending line section 31 which ends at the level of the plane E. As in the embodiment according to FIG. 16, the turning points 40', 40" that form maxima are positioned at the same level. In contrast to FIG. 16, in FIG. 17 the minimum, i.e., the turning point 40 inside the crater K, is designed such that it is positioned at the level of the plane E. An embodiment according to FIG. 17 can also be described as comprising two disturbing elements 30 and 30' which adjoin each other in the flow direction (arrow 28) of the air.

Figure 18:
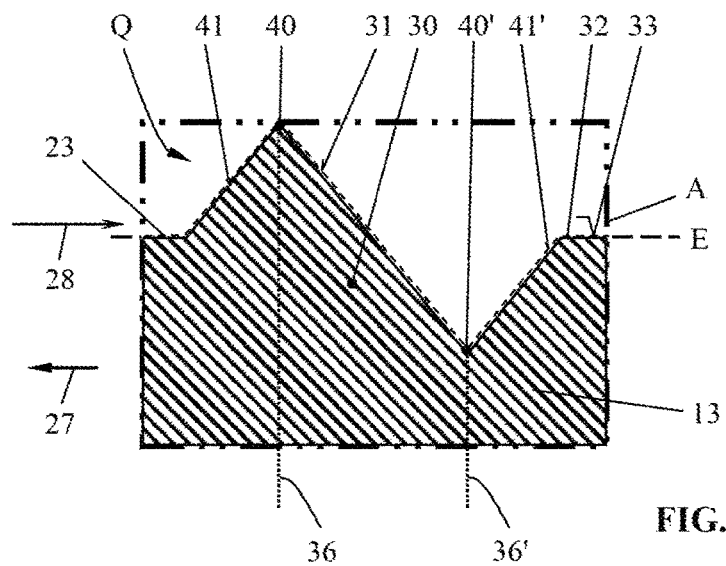
FIG. 18 is a section view in enlarged illustration of a disturbance element in an illustration according to FIG. 17 with a distinct elevation and an adjoining distinct recess as well as several turning points on a contour line extending across the disturbance element.

In the embodiment according to FIG. 18, the disturbance element 30 is formed by a combination of an elevation and a recess. The elevation is positioned above the plane E while the recess is positioned below the plane E. The incoming air flowing in the direction of arrow 28 first impinges on the ascending line section 41 which ascends from the plane E and rises to a maximum which forms the turning point 40. The descending line section 31 adjoins the ascending line section 41 and drops below the plane E to a minimum which forms a further turning point 40'. From the minimum, an ascending line section 41' is extending back to the level of the plane E.

Figure 19:
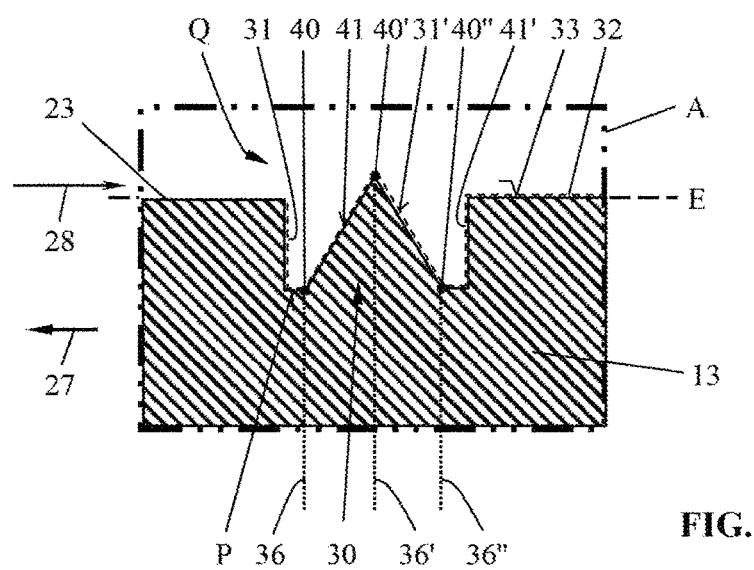
FIG. 19 is a section view in enlarged illustration of a disturbance element in an illustration according to FIG. 15 with an elevation arranged in a recess.

In the embodiment according to FIG. 19, an elevation 30 which is triangular in cross section in the illustrated embodiment is provided within a recess or depression below the plane E. The recess, similar to FIG. 15, is substantially rectangular and the triangular elevation is positioned at a spacing to the ascending walls of the recess.

The bottom of the recess forms, similar to FIG. 15, a plateau P with several possible turning points 40 of gradient zero.

The incoming air flowing in the direction of arrow 28 impinges first on a descending line section 31 which drops below the plane E and extends to the plateau P, i.e., the bottom of the recess. At the bottom of the recess the elevation of the disturbance element 30 follows and ascends with an ascending line section 41 to a maximum which is a further turning point 40'. A descending line section 31' follows the turning point 40', extends to the bottom of the depression, and ends at a further turning point 40" which, like the first turning point 40, is positioned at the level of the plateau P. An ascending line section 41'adjoins the bottom of the depression and rises to the plane E. The contour line 32 of the elevation profile 33 comprises thus two descending line sections 31 and 31' and two ascending line sections 41 and 41'. The turning points 40 and 40" that form minima are positioned at the level of the bottom of the rectangular recess; the turning point 40' forming a maximum between the ascending line section 41 and the descending line section 31' is positioned above the plane E and thus projects out of the recess. It can also be provided that the turning point 40' which forms a maximum is positioned below the plane E.

The cross sections of the cutting knives 10 illustrated in FIGS. 20 to 23 are embodied as reversible knives.

Figure 20:
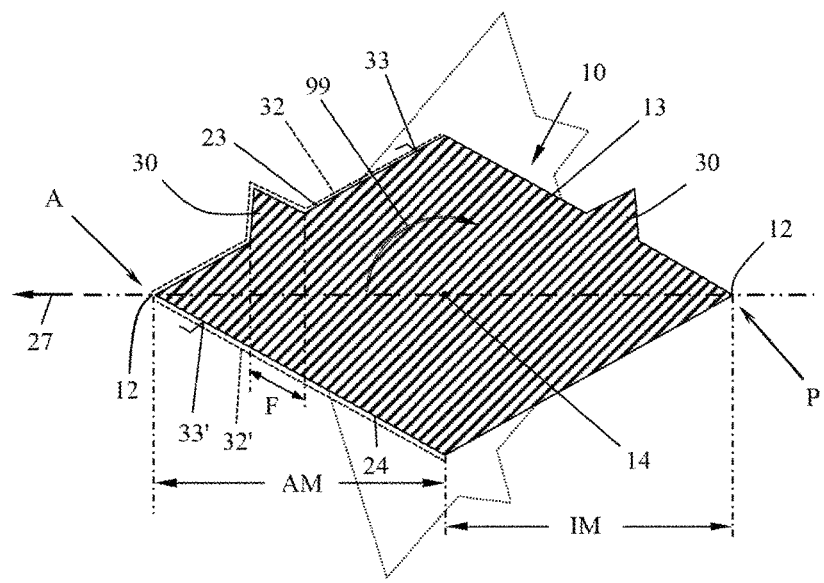
FIG. 20 is a schematic cross section illustration of the base member of a cutting knife in a first working position.

In order to obtain in the embodiment according to FIG. 20, provided with reversibility of the cutting knife 10 about the longitudinal center axis in the direction of arrow 99, the effect of noise reduction according to the invention in any position, a disturbance element 30 can be provided on the surface of the leading knife half AM as well as on the surface of the trailing knife half IM. This constructive configuration ensures that the elevation profiles 33 and 33' of the upper and lower faces 23, 24 of the knife topside and of the knife bottom side are different and that a different flow course is obtained at the upper and lower faces 23, 24, i.e., the knife topside and the knife bottom side. Independent of the reversible position of the cutting knife 10, the active knife half AM has in cross section an asymmetric shape so that noise reduction can be achieved.

Figure 21:
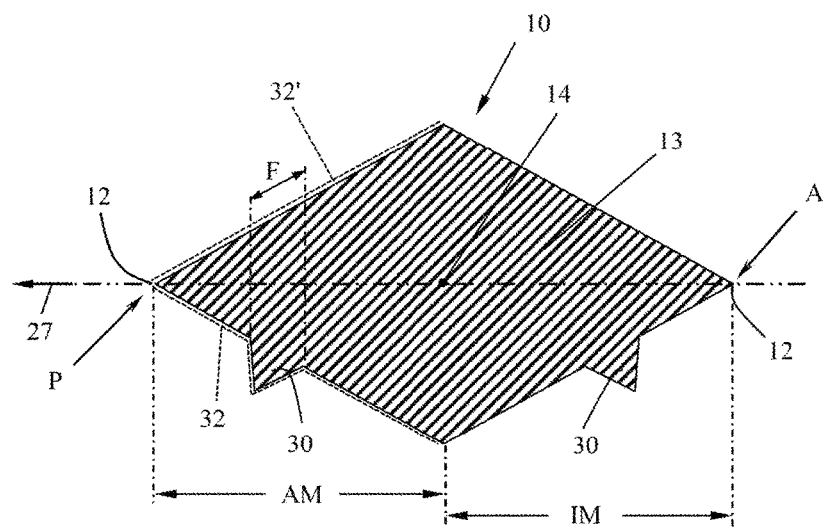
FIG. 21 is a schematic cross section illustration of the cutting knife according to FIG. 20 in a working position turned by 180° about the longitudinal center axis.

When the cutting knife 10 is rotated in the direction of arrow 99, as shown in FIG. 21, the point A of the previously active knife edge 12 is moved to the inactive knife half IM while the point P of the previously inactive knife edge 12 now is positioned in the active knife half AM. As soon as the inactive knife edge becomes active by turning the cutting knife 10, the inactive disturbance element 30 becomes an active disturbance element, and vice versa. An active disturbance element refers to a disturbance element 30 within the active knife half AM. An inactive disturbance element refers to a disturbance element 30 in the inactive knife half IM. The explanations and discussions provided in regard to the active disturbance element apply also to the inactive disturbance element. Between inactive knife edge and longitudinal center axis at least one inactive disturbance element can be provided on a face 23, 24, i.e., the knife bottom side or the knife topside.

Figure 22:
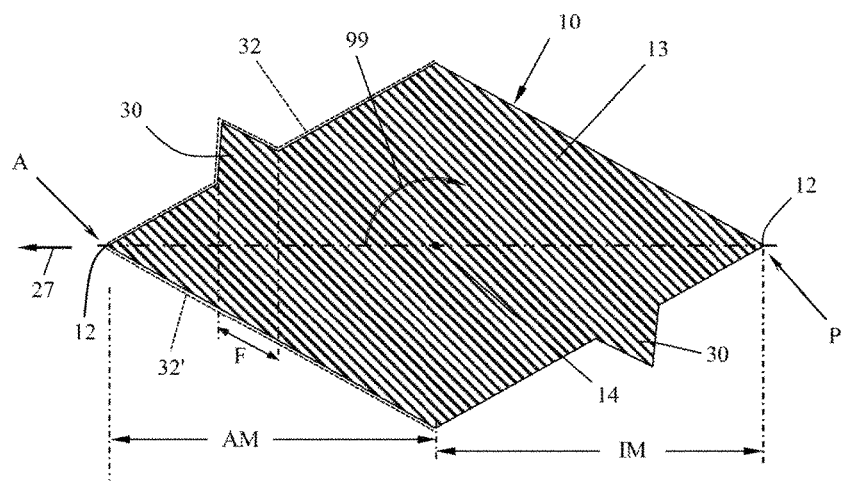
FIG. 22 shows a further embodiment of the base member of the cutting knife in a schematic cross section illustration in a first working position in accordance with FIG. 20.
Figure 23:
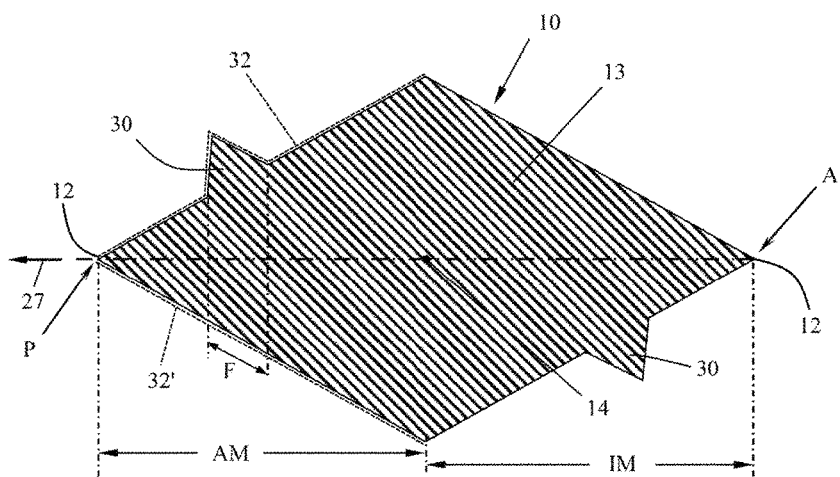
FIG. 23 is a schematic cross section illustration of the cutting knife according to FIG. 22 in the working position turned by 180° about the longitudinal center axis relative to FIG. 22.

Active disturbance element and inactive disturbance element can be positioned on the same face but also on different faces, as shown in FIGS. 20 to 23. An expedient embodiment is shown in FIGS. 22 and 23 in which the disturbance elements 30 are positioned advantageously with point symmetry relative to the longitudinal axis 14 of the base member 13. FIG. 22 shows a first working position of the cutting knife 10. FIG. 23 shows the working position of the cutting knife 10 turned by 180° about the longitudinal axis 14. The upper face 23 in the mounted position is at the top, the lower face 24 is positioned at the bottom in the mounted position. By turning the cutting knife 10, the previous upper face 23 becomes the lower face 24 and vice versa. In both working positions, the active disturbance element 30 is positioned in the active knife half AM of the same face, in the embodiment the top face, and in particular at the same location of this face.

Expediently, the inactive disturbance element can be arranged also on the same face as the active disturbance element, in particular mirror symmetrical to the longitudinal center axis 14 (FIGS. 20, 21). All illustrated embodiments have in common that the upper and lower faces differ in their elevation profile in the active knife area AM at the inflow side, i.e., exhibit an asymmetric cross section in an area between the active knife edge 12 and the longitudinal center axis 14 due to the presence of the at least one disturbance element 30.

As is clearly apparent from the various embodiments, on a first face, for example, upper face 23, a first disturbance element 30 is provided while in the area of this disturbance element 30 on the opposite second (bottom) face an area F is provided that does not contain a disturbance element with the same geometric extension and in particular contains no disturbance element at all.

As shown schematically in FIG. 4A, the at least one active disturbance element is arranged such that the measured lengths U, U' of the oppositely positioned contour lines 32, 32', measured between active knife edge and the adjacent closest turning point or the corresponding reference point, are different. Expediently, the measured lengths S, S' of the oppositely positioned contour lines 32, 32', measured between active knife edge 12 and longitudinal center axis 14, are different (FIG. 4A).

The undisturbed lengths V, V' of the area F that is free of disturbance elements 30 on the first (upper) face and the second (lower) face are different. The undisturbed length V, measured from the active knife edge 12 to a first closest active disturbance element 30 on a face 23, is different from the measured length V', measured in the same cross section from the active knife edge 12 to the adjacent closest active disturbance element 30 on the opposite face 24. When the oppositely positioned face has no active disturbance element 30, the measured length V' ends at the level of the longitudinal center axis 14. For simplification of the illustration, the lengths S, S', U, U', V, V' are illustrated such that they follow the elevation profile 32. For comparison of the lengths, the developments of these illustrations are to be used. An arrangement of the at least one active disturbance element, which fulfills at least one of the aforementioned length relationships, ensures an asymmetric cross section and thus noise reduction. The length relationships compare lengths of directly oppositely positioned contour lines, i.e., contour lines which are determined in the same cross section of the cutting knife 10.

Figure 24:
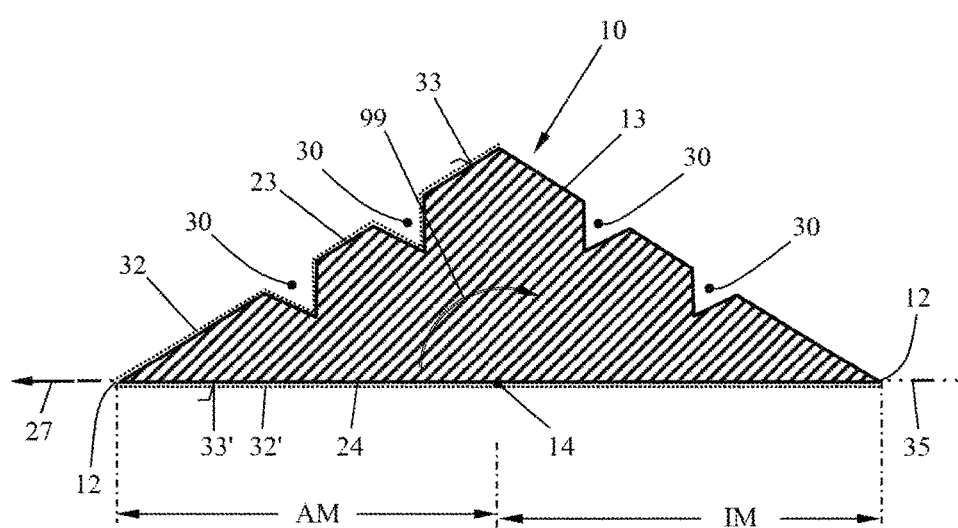
FIG. 24 shows a further embodiment of the base member of the cutting knife in a schematic cross section illustration.

In the embodiment according to FIG. 24, a further embodiment of a cutting knife is illustrated in cross section, wherein same parts are identified with the same reference characters as in the preceding embodiments. The cross section of the base member 13 is triangular wherein the center plane 35 shown in the preceding embodiments coincides with the lower face 24 for the triangular base member 13 of FIG. 24. The illustrated cutting knife is again a reversible knife with an active knife half AM and an inactive knife half IM. When the cutting knife 10 is turned in direction of arrow 99, the previously active knife edge 12 is now moved into the inactive knife half IM while the previously inactive knife edge 12 is now moved into the active knife half AM.

In FIG. 25, a constriction E2 between the fastening section 11 and the base member 13 is less pronounced than the constriction E1 as shown, for example, in FIG. 2. The fastening section 11 in the embodiment according to FIG. 25 has a first width K1 and the base member 13 a second width K2. The width K2 is a maximum width of the base member 13. The second width K2 of the base member 13 is smaller than the first width K1 of the fastening section 11. In the illustrated embodiment according to FIG. 25, the constriction between the fastening section 11 and the first end 16 of the base member 13 has a width E2 that is smaller than the width K1 of the fastening section 11 and is the same or greater than the width K2 of the base member 13. In the illustrated embodiment according to FIG. 25, the width E2 of the constriction corresponds approximately to the arithmetic mean of the first width K1 and the second width K2.

Also, the embodiment of the thickness of the cutting knife 10 from the fastening section 11 to the second end 17 of the base member 13 differs from the afore described embodiments. While in the afore described embodiments a step 70 with a preferably rounded jump in thickness is formed between the thickness D1 of the fastening section 11 and the thickness D2 of the base member 13, the embodiment according to FIGS. 25 and 26 comprises an in particular uniformly tapering transition Y from the thickness D1 to the thickness D2. As shown in FIG. 26, the transition Y from the fastening section 11 with the thickness D1 to the thickness D2 of the base member 13 extends to a point located approximately at half the length of the base member 13, in particular a point located at half the length of the base member 13. The length section Z of the base member 13 between half the length and the second end 17 of the base member 13 or the free knife end 15 has preferably the same thickness D2 across its length.

The specification incorporates by reference the entire disclosure of German priority documents 10 2016 000 719.2 having a filing date of 23 Jan. 2016 and 10 2016 002 607.3 having a filing dated of 3 Mar. 2016.

While specific embodiments of the invention have been shown and described in detail to illustrate the inventive principles, it will be understood that the invention may be embodied otherwise without departing from such principles.

What is claimed is:

1. A cutting knife for a cutting head of a trimmer, the cutting knife comprising:
    a flat elongate base member comprising a first end and a second end, wherein a longitudinal center axis of the base member extends from the first end to the second end;
    the base member comprising first and second longitudinal edges extending at a spacing to the longitudinal center axis from the first end to the second end;
    the base member having a first face and a second face between which a center plane is positioned, wherein the first and second faces each are delimited in a first direction transverse to the longitudinal center axis by the first and second longitudinal edges of the base member and, in a second direction along the longitudinal center axis, delimited by the first end and the second end of the base member;
    a fastening contour for mounting the cutting knife on the cutting head connected to the first end of the base member, wherein the second end of the base member is a free knife end of the cutting knife;
    wherein on the first and second longitudinal edges of the base member a knife edge is formed, respectively, wherein, when the cutting head is rotating in a rotational direction in operation, either the knife edge of the first longitudinal edge is leading in the rotational direction and is a first active knife edge or the knife edge of the second longitudinal edge is leading in the rotational direction and is a second active knife edge;

at least the first face comprising at least one topographic disturbance element in an area between the first active knife edge or the second active knife edge and the longitudinal center axis of the base member;

wherein the at least one topographic disturbance element shapes a first elevation profile of the first face, wherein a contour line of the first elevation profile extends, transverse to the longitudinal center axis of the base member, from the first active knife edge or the second active knife edge in a direction toward the longitudinal center axis across the at least one topographic disturbance element;

wherein an oppositely positioned second elevation profile is formed on the second face that is positioned opposite the first face relative to the center plane, wherein a contour line of the oppositely positioned second elevation profile extends from the first active knife edge or the second active knife edge in the direction to the longitudinal center axis;

wherein the contour line of the first elevation profile comprises first contour line points and wherein the contour line of the oppositely positioned second elevation profile comprises second contour line points, wherein the first contour line points are positioned opposite the second contour line points on perpendiculars to the center plane of the base member;

wherein the contour line of the first elevation profile and the contour line of the oppositely positioned second elevation profile are noncongruent;

wherein the at least one topographic disturbance element arranged on the first face has no topographic disturbance element arranged opposite thereto at a same level on the second face so that a flow path of air that is flowing across the first face is disturbed by the at least one topographic disturbance element while a flow path of air flowing across the second face at said same level where there is no topographic disturbance element flows substantially without disturbance across the second face;

wherein the contour line of the first elevation profile in the area of the at least one topographic disturbance element comprises a first increasing line section and a second descending line section;

wherein the contour line of the first elevation profile comprises at least one turning point positioned between the first increasing line section and the second descending line section, wherein the at least one turning point is a part of the at least one topographic disturbance element.

2. The cutting knife according to claim 1, wherein the at least one turning point is arranged on a perpendicular to the center plane and has a first spacing to the center plane, wherein a reference point is provided on the second face and is positioned directly opposite the turning point relative to the same perpendicular to the center plane, wherein the reference point has a second spacing relative to the center plane, and wherein the first spacing is unequal to the second spacing.

3. The cutting knife according to claim 2, wherein the first spacing and the second spacing differ from each other by a spacing difference of up to ±100% of the second spacing.

4. The cutting knife according to claim 1, wherein the base member comprises a knife back surface and edge surfaces, wherein the first and second longitudinal edges are edges of the edge surfaces, wherein the edge surfaces and the knife back surface together form the first face of the base member, wherein the knife back surface is divided by the longitudinal center axis of the base member, and wherein the at least one topographic disturbance element is positioned in an area between one of the edge surfaces and the longitudinal center axis of the base member.

5. The cutting knife according to claim 1, wherein the at least one topographic disturbance element extends along the first active knife edge or the second active knife edge and has a width measured transverse to the first active knife edge or the second active knife edge along which the at least one topographic disturbance element is extending.

6. The cutting knife according to claim 1, wherein the at least one topographic disturbance element is an elevation that is projecting from the first face.

7. The cutting knife according to claim 1, wherein the at least one topographic disturbance element is a longitudinal rib or a longitudinal groove.

8. The cutting knife according to claim 7, wherein the longitudinal rib or the longitudinal groove is positioned relative to the longitudinal center axis at an angle in a range of 0° to 10°.

9. The cutting knife according to claim 8, wherein the angle is in a range of 2° to 4°.

10. The cutting knife according to claim 7, wherein the longitudinal groove or the longitudinal rib extends across at least a partial length of the base member from the first end of the base member in a direction toward the free knife end.

11. The cutting knife according to claim 7, wherein the longitudinal groove or the longitudinal rib is extending without interruption from the first end of the base member all the way to the free knife end.

12. The cutting knife according to claim 7, wherein the longitudinal rib or the longitudinal groove tapers off in a direction toward the free knife end.

13. The cutting knife according to claim 1, wherein the base member comprises a knife back surface that is embodied as a flat plane in at least one partial area of the base member.

14. The cutting knife according to claim 1, wherein the base member is comprised of plastic material.

15. The cutting knife according to claim 1, wherein the at least one topographic disturbance element effects a constructive non-symmetric cross section shape of the base member between the first active knife edge or the second active knife edge and the longitudinal center axis of the base member.

16. The cutting knife according to claim 1, wherein the at least one topographic disturbance element generates an asymmetric cross section in an area between the first active knife edge or the second active knife edge and the longitudinal center axis so that the first and second elevation profiles differ in an active knife area at an inflow side.

17. The cutting knife according to claim 1, wherein a first length of the contour line of the first elevation profile is measured between the first active knife edge or the second active knife edge and the longitudinal center axis, wherein a second length of the contour line of the second elevation profile is measured between the first active knife edge or the second active knife edge and the longitudinal center axis, and wherein the first length and the second length are different.

18. The cutting knife according to claim 1, wherein between the first active knife edge or the second active knife edge and the longitudinal center axis a single one of the at least one topographic disturbance element is arranged.

19. A cutting knife for a cutting head of a trimmer, the cutting knife comprising:

a flat elongate base member comprising a first end and a second end, wherein a longitudinal center axis of the base member extends from the first end to the second end;

the base member comprising longitudinal edges extending at a spacing to the longitudinal center axis from the first end to the second end;

the base member having a first face and a second face between which a center plane is positioned, wherein the first and second faces each are delimited in a first direction transverse to the longitudinal center axis by the longitudinal edges of the base member and, in a second direction along the longitudinal center axis, delimited by the first end and the second end of the base member;

a fastening contour for mounting the cutting knife on the cutting head connected to the first end of the base member, wherein the second end of the base member is a free knife end of the cutting knife;

wherein at least on one of the longitudinal edges of the base member a knife edge is formed;

at least the first face comprising at least one topographic disturbance element in an area between the knife edge and the longitudinal center axis of the base member;

wherein the at least one topographic disturbance element shapes a first elevation profile of the first face, wherein a contour line of the first elevation profile extends, transverse to the longitudinal center axis of the base member, from the knife edge in a direction toward the longitudinal center axis across the at least one topographic disturbance element;

wherein an oppositely positioned second elevation profile is formed on the second face that is positioned opposite the first face relative to the center plane, wherein a contour line of the oppositely positioned second elevation profile extends from the knife edge in the direction to the longitudinal center axis;

wherein the contour line of the first elevation profile comprises first contour line points and wherein the contour line of the oppositely positioned second elevation profile comprises second contour line points, wherein the first contour line points are positioned opposite the second contour line points on perpendiculars to the center plane of the base member;

wherein the contour line of the first elevation profile and the contour line of the oppositely positioned second elevation profile are noncongruent;

wherein the contour line of the first elevation profile in the area of the at least one topographic disturbance element comprises a first increasing line section and a second descending line section;

wherein the contour line of the first elevation profile comprises at least one turning point positioned between the first increasing line section and the second descending line section, wherein the at least one turning point is a part of the at least one topographic disturbance element;

wherein the at least one turning point is arranged on a perpendicular to the center plane and has a first spacing to the center plane, wherein a reference point is provided on the second face and is positioned directly opposite the turning point relative to the same perpendicular to the center plane, wherein the reference point has a second spacing relative to the center plane, and wherein the first spacing is unequal to the second spacing;

wherein an absolute value of a spacing difference between the first spacing and the second spacing is in a range of 0.2 mm to 2 mm.

20. A cutting knife for a cutting head of a trimmer, the cutting knife comprising:

a flat elongate base member comprising a first end and a second end, wherein a longitudinal center axis of the base member extends from the first end to the second end;

the base member comprising longitudinal edges extending at a spacing to the longitudinal center axis from the first end to the second end;

the base member having a first face and a second face between which a center plane is positioned, wherein the first and second faces each are delimited in a first direction transverse to the longitudinal center axis by the longitudinal edges of the base member and, in a second direction along the longitudinal center axis, delimited by the first end and the second end of the base member;

a fastening contour for mounting the cutting knife on the cutting head connected to the first end of the base member, wherein the second end of the base member is a free knife end of the cutting knife;

wherein at least on one of the longitudinal edges of the base member a knife edge is formed;

at least the first face comprising at least one topographic disturbance element in an area between the knife edge and the longitudinal center axis of the base member;

wherein the at least one topographic disturbance element shapes a first elevation profile of the first face, wherein a contour line of the first elevation profile extends, transverse to the longitudinal center axis of the base member, from the knife edge in a direction toward the longitudinal center axis across the at least one topographic disturbance element;

wherein an oppositely positioned second elevation profile is formed on the second face that is positioned opposite the first face relative to the center plane, wherein a contour line of the oppositely positioned second elevation profile extends from the knife edge in the direction to the longitudinal center axis;

wherein the contour line of the first elevation profile comprises first contour line points and wherein the contour line of the oppositely positioned second elevation profile comprises second contour line points, wherein the first contour line points are positioned opposite the second contour line points on perpendiculars to the center plane of the base member;

wherein the contour line of the first elevation profile and the contour line of the oppositely positioned second elevation profile are noncongruent;

wherein the contour line of the first elevation profile in the area of the at least one topographic disturbance element comprises a first increasing line section and a second descending line section;

wherein the contour line of the first elevation profile comprises at least one turning point positioned between the first increasing line section and the second descending line section, wherein the at least one turning point is a part of the at least one topographic disturbance element;

wherein the at least one topographic disturbance element is a recess formed as a depression in the first face.

* * * * *